Figure 11:
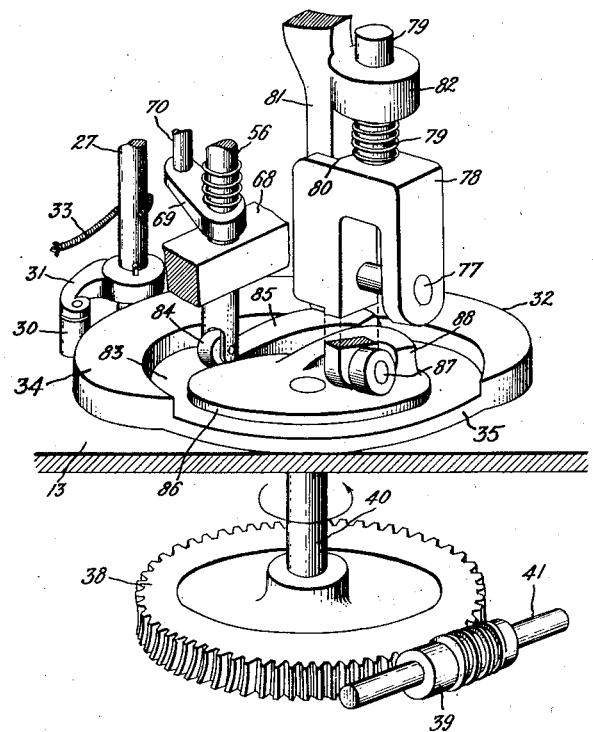

Sept. 1, 1931. Y. OTAKA 1,821,894
AUTOMATIC MOUNT MAKING MACHINE FOR INCANDESCENT
LAMPS AND SIMILAR ARTICLES
Filed Dec. 27, 1928 11 Sheets-Sheet 1
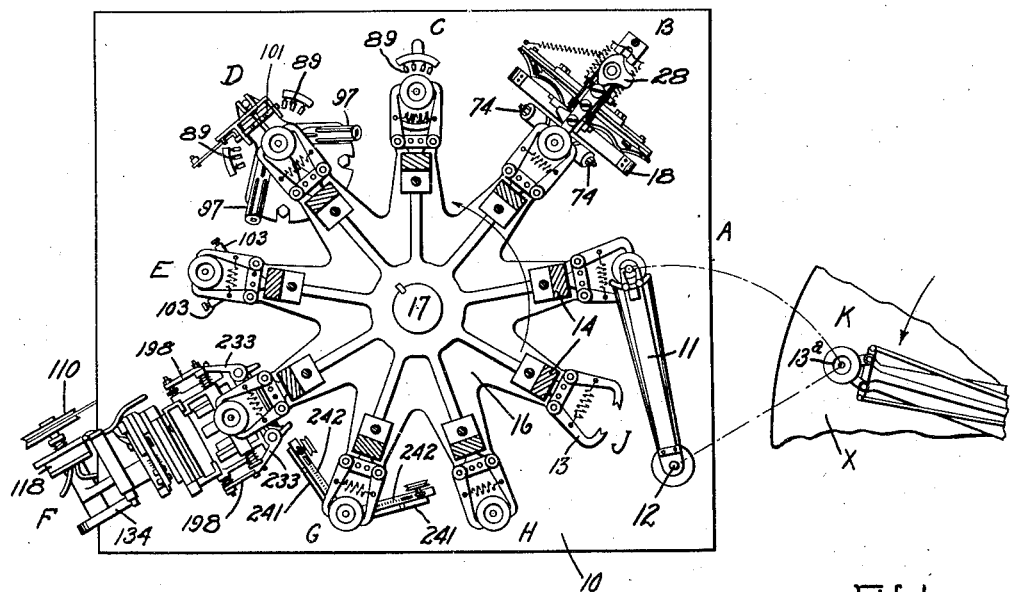
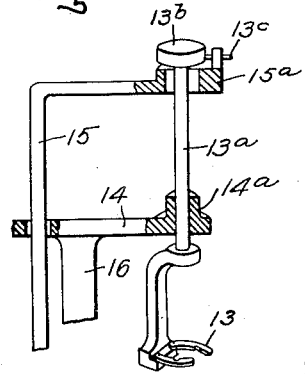
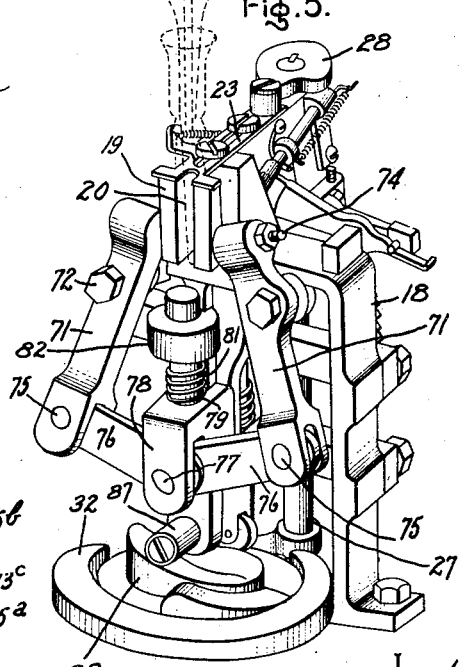
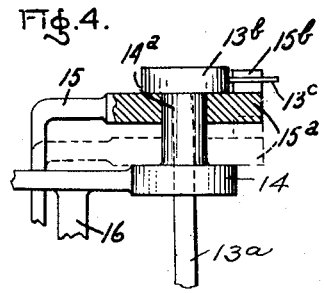
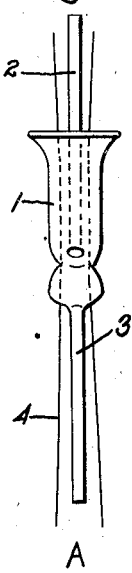
Inventor.
Yoshiro Otaka,
by Charles E. Tullar
His Attorney.

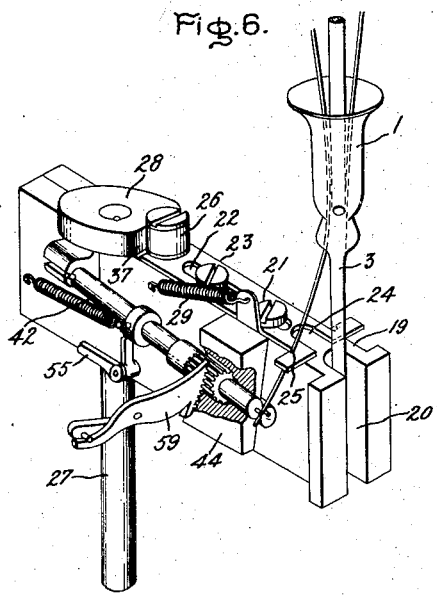
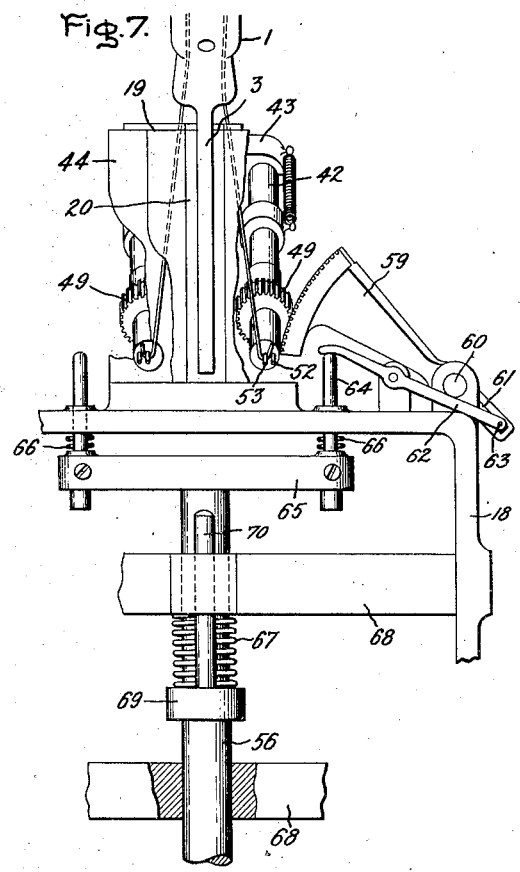
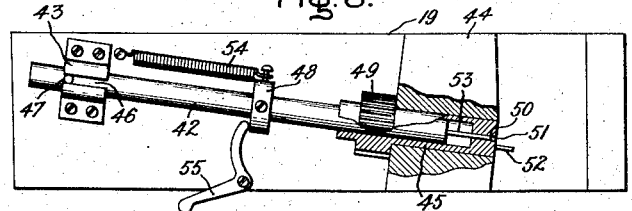
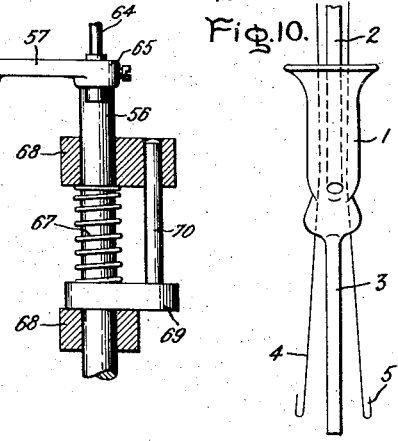
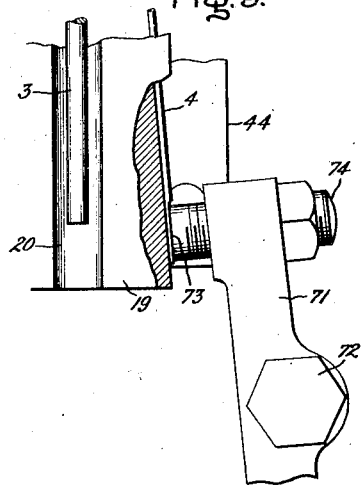

Sept. 1, 1931.   Y. OTAKA   1,821,894
AUTOMATIC MOUNT MAKING MACHINE FOR INCANDESCENT
LAMPS AND SIMILAR ARTICLES
Filed Dec. 27, 1928    11 Sheets-Sheet 3

Inventor:
Yoshiro Otaka,
by Charles E. Muller
His Attorney.

Sept. 1, 1931.  Y. OTAKA  1,821,894
AUTOMATIC MOUNT MAKING MACHINE FOR INCANDESCENT
LAMPS AND SIMILAR ARTICLES
Filed Dec. 27, 1928  11 Sheets-Sheet 4
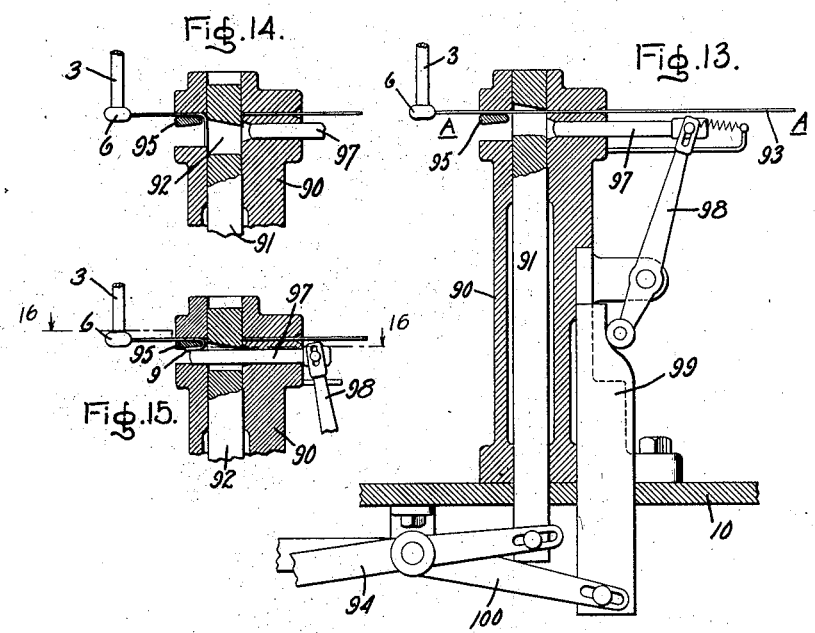
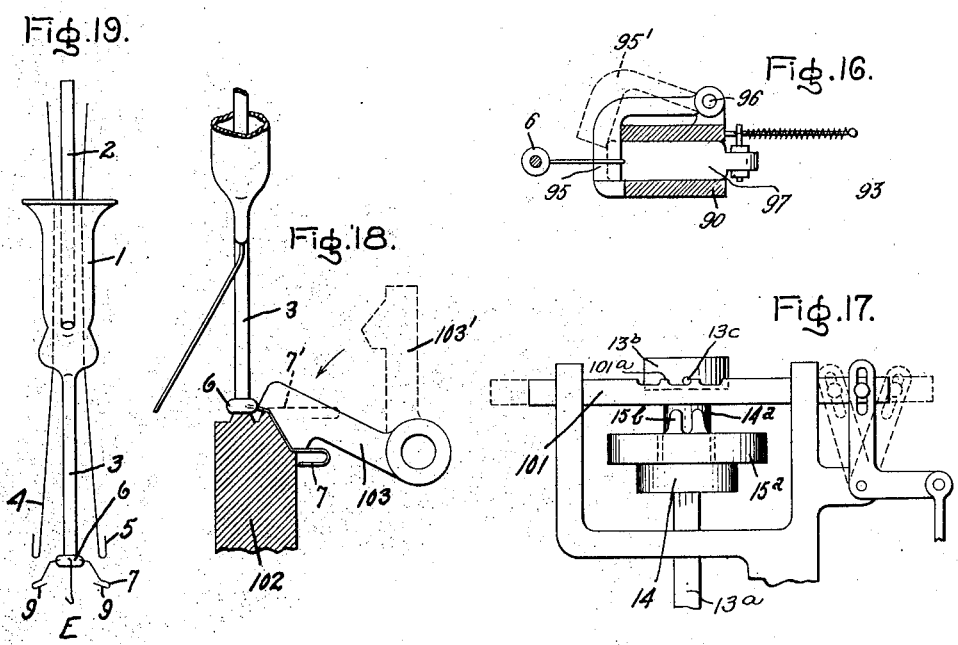
Inventor:
Yoshiro Otaka,
by Charles E. Tullar
His Attorney.

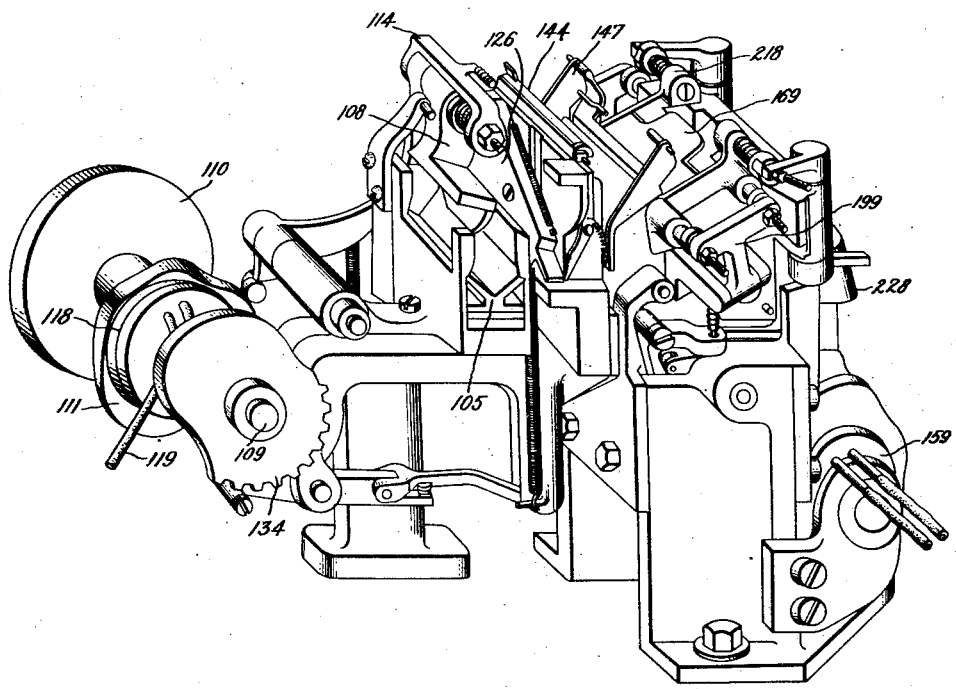

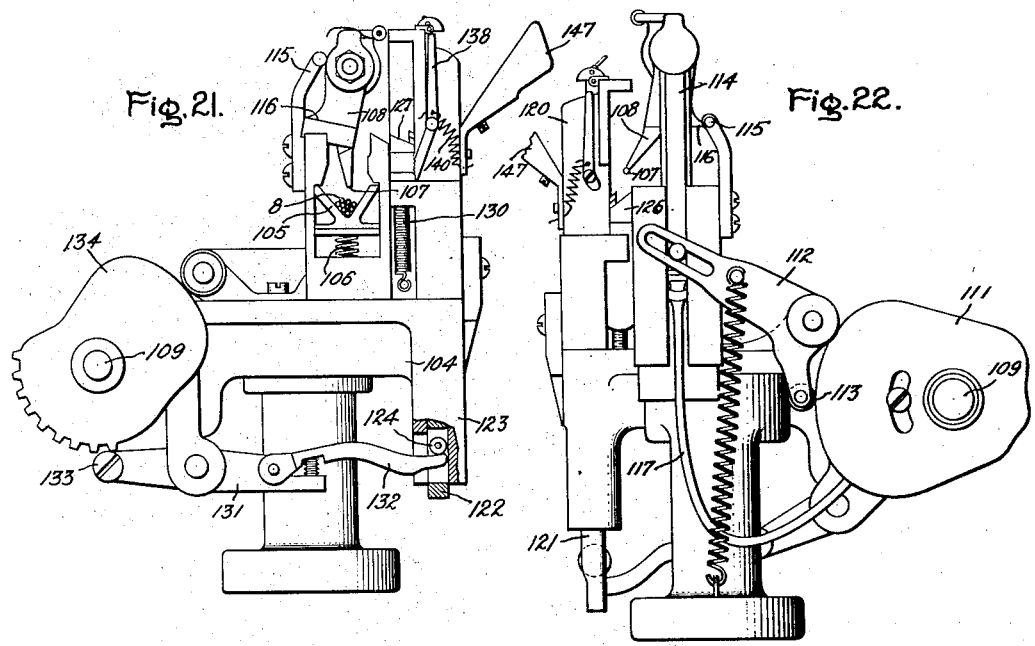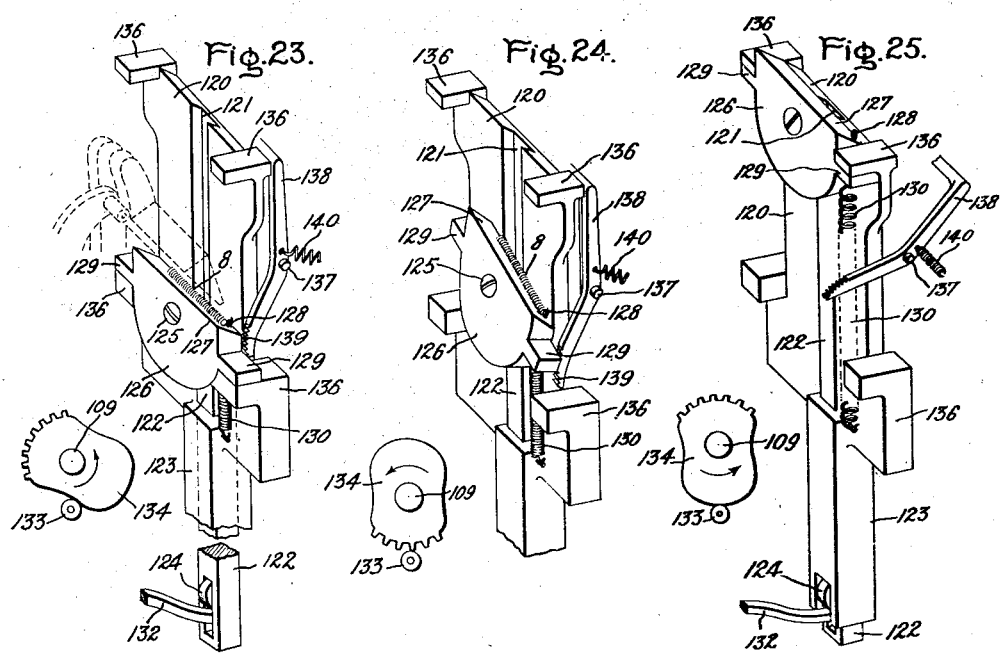

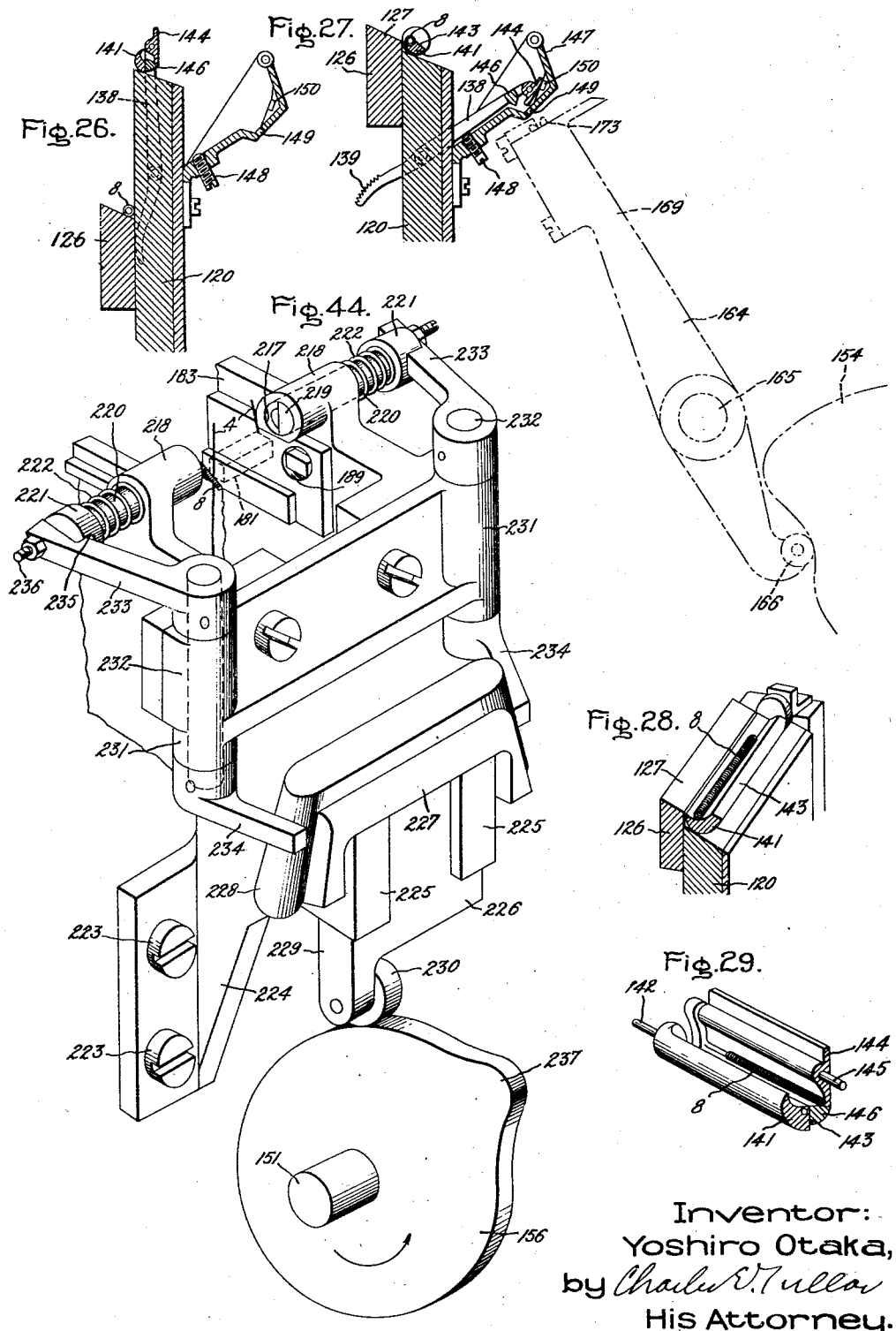

Inventor:
Yoshiro Otaka,
by Charles E. Tullar
His Attorney.

Sept. 1, 1931.  Y. OTAKA  1,821,894
AUTOMATIC MOUNT MAKING MACHINE FOR INCANDESCENT
LAMPS AND SIMILAR ARTICLES
Filed Dec. 27, 1928    11 Sheets-Sheet 10

Inventor:
Yoshiro Otaka,
by Charles E. Mullan
His Attorney.

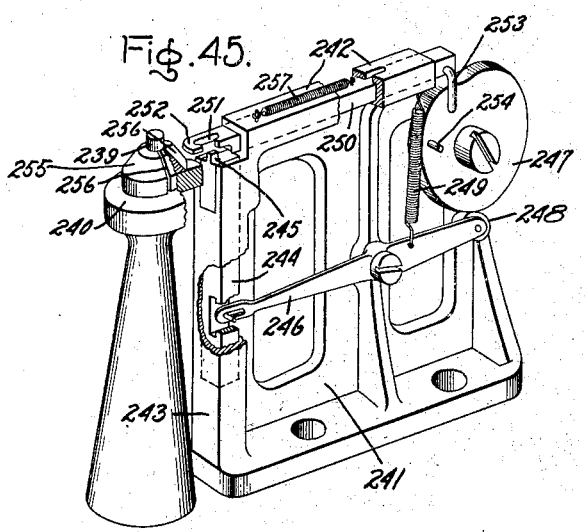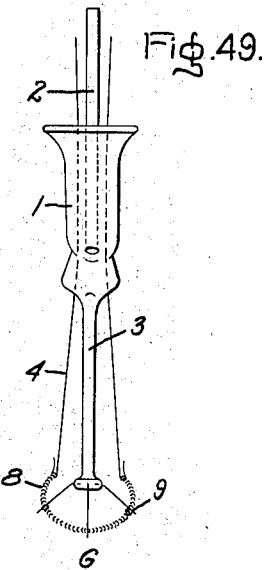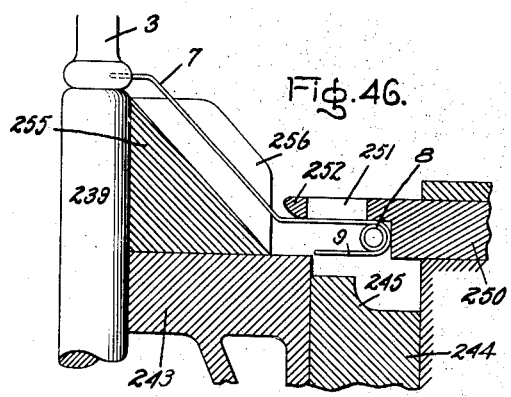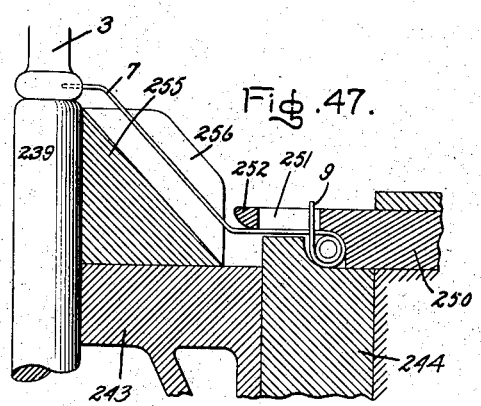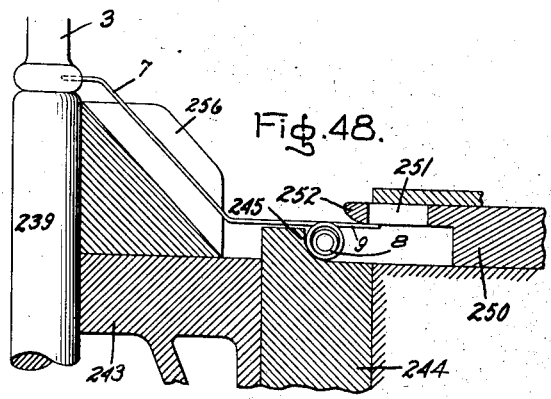

Patented Sept. 1, 1931

1,821,894

UNITED STATES PATENT OFFICE

YOSHIRO OTAKA, OF TOKYO, JAPAN, ASSIGNOR TO GENERAL ELECTRIC COMPANY, A CORPORATION OF NEW YORK

AUTOMATIC MOUNT MAKING MACHINE FOR INCANDESCENT LAMPS AND SIMILAR ARTICLES

Application filed December 27, 1928, Serial No. 328,729, and in Japan January 28, 1928.

The present invention relates to automatic mount making machines for incandescent lamps and similar articles, and more particularly to machines for mounting in anchors inserted in the stem in definite and predetermined relation to the axis of the stem, a ring-shaped coiled filament cut to length beforehand, fed into the machine, automatically bent into a shape to fit into the hooks of the anchors, and then placed in the hooks.

The principal object of the invention is to obtain a uniform product and to save labor by performing the steps of the mount making process automatically and accurately with materials prepared the same as for ordinary hand work and without requiring any particular procedure other than is needed for ordinary hand work.

Attempts have heretofore been made to automatically mount a filament, particularly a coiled filament, on the anchors of the stem or on the hooks of the leads. In mounting coiled filaments automatically the mandrels on which the filament is coiled are often retained to facilitate handling the flexible yielding filaments, the mandrels being removed by baking, heating or chemical treatment after the mounting of the filament is completed. However, getting rid of this mandrel after mounting the filament causes complications. For instance, the part of the mandrel clamped by the anchor hook is very difficult to remove for if it is clamped loose enough to be easy to get out the filament is usually clamped too loose and the mount may be rejected. Cutting the filament to length after it is anchored whether it has a mandrel or not, and thereby avoiding the cutting of it beforehand to any specified length has been proposed, and if the coiled filament contains a mandrel it might be anchored and then cut, but on the other hand, there may be difficulty in heating or annealing the mandrel because of its length.

The present invention provides an automatic apparatus comprising a device for positioning the hooks of the anchors on the stem to outline any desired figures such as a horseshoe for the ordinary incandescent lamp, and a device for placing in the anchor hooks a filament cut beforehand to the right length and bent into a shape corresponding to that figure, as for example, a horseshoe. Since the apparatus receives the filaments of the right length and without mandrels, and then mounts them, the product is not only free from the defects heretofore encountered, but no special operations are required to practice the invention, such as removing mandrels from the mounted filaments.

In the present invention the filaments before being anchored are bent or shaped to correspond in form to the figure formed by the anchor hooks, hence there is no distortion of the anchors, which usually not only support the filament but also forcibly hold it in shape after it is anchored.

The present invention can be employed to mount a filament directly on the leads of the stem in miniature lamps which have no anchors, and since the apparatus shown in the drawings may be used for that purpose without any material modification in its design, it is useful for all lamps, either with or without anchors. By the present invention the filament fed to the apparatus for mounting on the stem of the miniature lamp is held near the ends and then bent into S or U shape before being mounted, and such a filament can be mounted directly on the leads without departing from the spirit of the invention. For positioning the hooks on the lead wires and anchors it is preferable to provide as a part of the apparatus hook bending mechanism for making hooks on the free ends of the leads sealed into the stem, and anchor inserting mechanisms for inserting anchors in a button on the end of the glass cane or arbor of the stem where anchors are needed, as the proper arrangement and disposition of the hooks is greatly facilitated by such mechanisms. The hook making mechanism forms the hooks on the leads so that they remain in a definite position after the leads are once correctly positioned and are open in a definite direction without requiring any additional operation. The anchor inserting mechanism for inserting the anchors fixes them in definite positions with the anchor hooks formed so as to be open transversely of the axis of the stem in a direction to permit the shaped filament to be slid into the hooks. If desired, the anchors may be bent after insertion to bring the hooks of both the anchors and the leads into a plane which extends transversely of the stem and below the end of the can or arbor, whereby the subsequent mounting of the filament in the hooks is much facilitated.

The filaments fed to the mounting device should be accurately placed or positioned before they are gripped near the ends at an equal distance from each end to hold them evenly, and thereby facilitate the bending or shaping them into any required form and also the placing of them in the hooks. To this end there is provided, in accordance with the invention, a device by which the filaments before they are gripped, are placed on an inclined platform with a stop or gauge at one end against which the ends of the filaments abut as the filaments slide lengthwise on the platform. As the filaments are properly annealed, are straight and are all cut to the same length, they are ready for mounting and will take the required position in the mounting mechanism.

The filaments may, of course, be fed to the machine one by one, but in accordance with the invention a filament feeding device is provided which picks up one filament out of a bunch of filaments supplied all at once and delivers it to the mounting device.

The present invention also provides hook closing mechanism by which the hooks on the leads are closed to make the joint between the filament and the lead more secure and the anchor hooks are made into closed loops to prevent easy disengagement of the filament from the hooks. In order that each operation may be carried out uniformly and quickly the apparatus has an intermittently rotatable carrier with a plurality of stem heads or supporters for presenting each stem to the various mechanisms in succession to be operated on by the mechanism.

Figure 12:
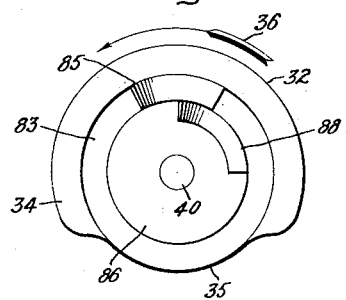
Figure 30:
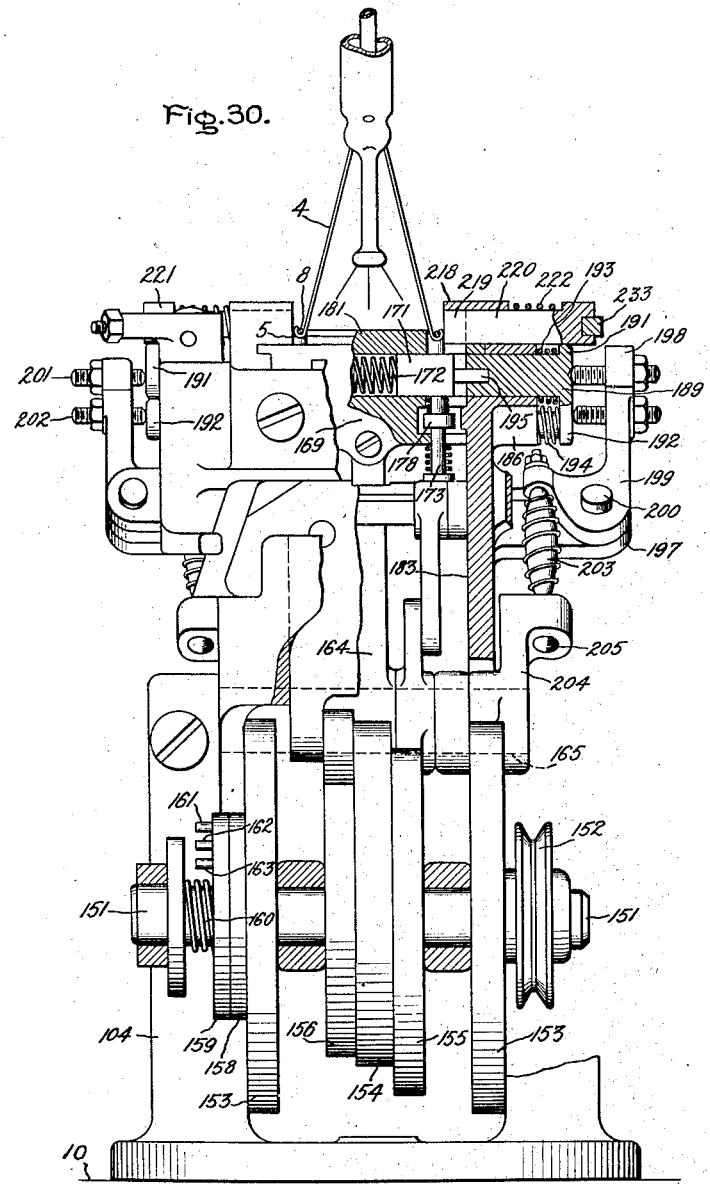
Figure 33:
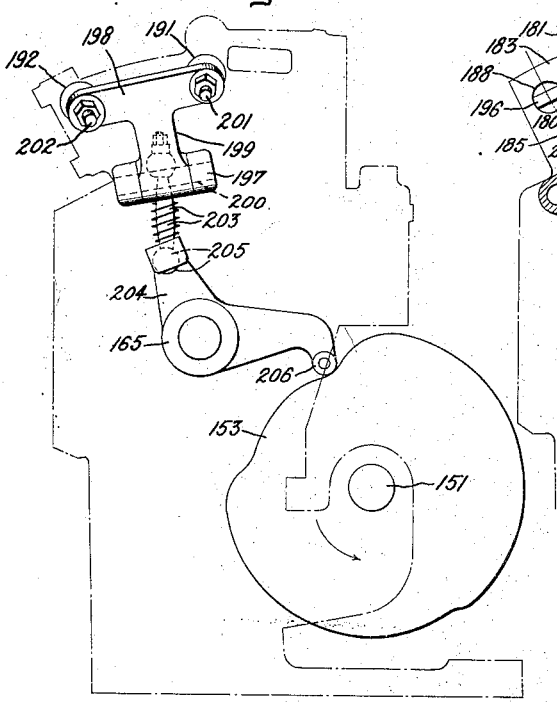
Figure 32:
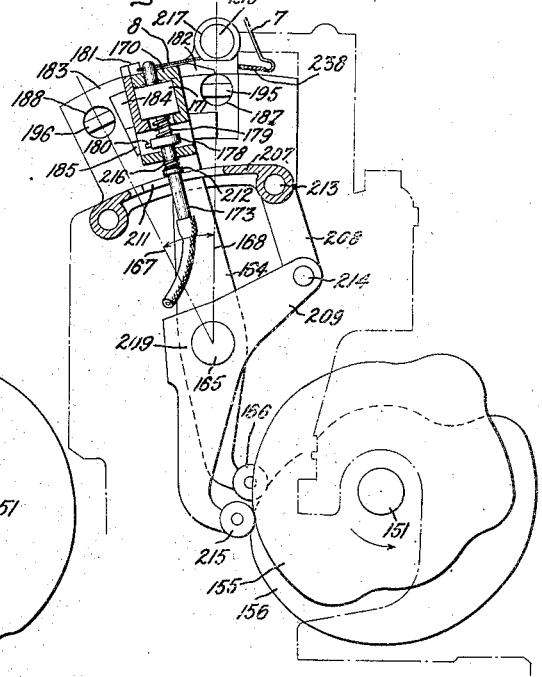
Figure 31:
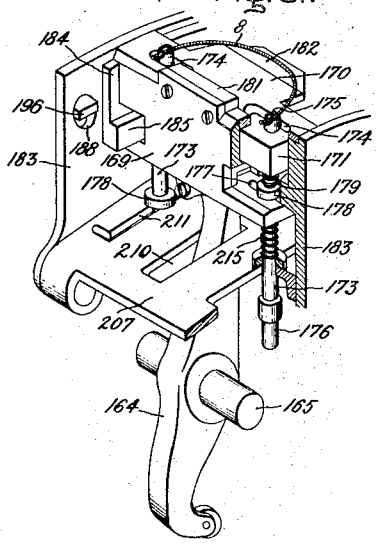
Figure 34:
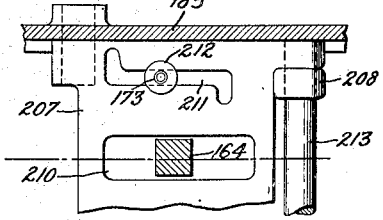

The characteristics and mode of operation of the apparatus constructed according to the present invention will be better understood from the following more detailed description, and the accompanying drawings, which show one embodiment of the invention, and in which Fig. 1 shows the stem as placed in the mount-making machine; Fig. 2 is a plan view of the mount-making machine and a part only of an adjacent stem-making machine; Fig. 3 is a side view, partly in section, of one of the stem heads for holding the stem during mount making; Fig. 4 is a vertical section on a larger scale of the upper part of the stem head; Fig. 5 a perspective view from the front or inner end of the lead hook bending mechanism at working position B; Fig. 6 a perspective view on a larger scale of the upper part of Fig. 5; Fig. 7 a front view of the hook bender; Fig. 8 a side view, partly in section, of a part of the hook bender shown in Fig. 7; Fig. 9 a partly sectional view of the lead flattener forming part of Fig. 5; Fig. 10 a view of the stem with the hooks made on the leads at working position B; Fig. 11 a perspective view of the master cam and associated parts for actuating the lead hook mechanism shown in Fig. 5; Fig. 12 a plan view of the master cam; Fig. 13 a view, partly in vertical section, of an anchor inserting and hook forming device at working position D of Fig. 2; Fig. 14 a vertical section of the upper end of that device with the hook on the anchor partly formed; Fig. 15 a similar view showing the parts with the anchor hook completely formed; Fig. 16 a cross-sectional view, along the line 16—16 of Fig. 15 showing the mandrel around which the anchor hook is bent; Fig. 17 a side view of a slide for rotating the stem slightly at working position D to swing the ends of the anchors out of the anchor hook mechanism of Fig. 13; Fig. 18 a side view, partly in longitudinal section, of the anchor bending mechanism at working position E of Fig. 2; Fig. 19 a view of the stem with the anchors bent and as it leaves working position E; Fig. 20 a perspective view from the outer or rear end, of a filament pick-up transfer and placing mechanism at working position F; Fig. 21 a side view partly in vertical section looking at one end of the filament pick up and transfer mechanism; Fig. 22 a side view of the same mechanism looking at the other end; Fig. 23 a perspective view of a filament setting mechanism as it receives a filament; Fig. 24 a similar view of the same mechanism at a point in its movement where the filament is accurately set in a predetermined position; Fig. 25 a similar view of the same mechanism at the end of its movement, after the accurately set filament has been delivered to a filament transfer device; Fig. 26 a view in vertical section of the upper part of the device shown in Fig. 23 with its associated filament transfer; Fig. 27 a similar view with the parts in position where a filament is delivered to the filament placing mechanism shown in broken lines; Fig. 28 a view in perspective and partially in section of a filament transfer trough for transferring the accurately set filament from the filament setting device; Fig. 29 a view in perspective and partly in cross-section of the filament conveyor which carries the filament from the transfer trough to the filament placing device; Fig. 30 an end view in elevation and partial vertical section of the filament placing mechanism at working position F for placing the filament in the hooks of the mount and fastening its ends to the leads; Fig. 31 a view in perspective and in partial vertical cross-section of part of the filament placing mechanism shown in Fig. 30, showing the bodily movable head and associated parts which carry the filament body sidewise into the anchor hooks; Fig. 32 a vertical section through the device shown in Fig. 30 just outside one of the vertical pins 173; Fig. 33 a side view showing certain operating mechanism of the device shown in Fig. 30; Fig. 34 a view looking down on a part of the mechanism shown in Fig. 32; Figs. 35, 36, 37 and 38 perspective views showing successive positions of the filament holding pins of the filament placing device from the receiving of the filament in Fig. 35 the filament is received by it to the placing of it in the anchor hooks in Fig. 38; Figs. 39, 40, 41 and 42 are diagrams showing the corresponding position of the parts which control these filament holding pins during the filament placing operations; Fig. 43 a view of the stem with the filament in place in the anchor hooks and its ends fastened to the leads as the stem comes from working position F of Fig. 2; Fig. 44 a perspective view of the clamping device for closing the hooks of the leads to clamp them to the ends of the filament; Fig. 45 a perspective view partly in section of an anchor hook closing device forming part of the hook closing mechanism at working position G in Fig. 2; Fig. 46 a longitudinal section of the device shown in Fig. 45 with the hook closing jaws in their initial position, preparatory to closing the anchor hooks; Fig. 47 a similar view of the same parts in their next position, with the anchor hook partly closed; Fig. 48 a similar view of the same parts in their final position with the anchor hooks completely closed around the filament; and Fig. 49 a view of the finished stem as it leaves working position G of Fig. 2 ready to be removed from the mount making machine.

A mount making machine may be constructed in accordance with the present invention to use a tipless stem such as shown in Fig. 1, comprising a stem tube 1, exhaust tube 2 and cane rod or arbor 3, all fused together at their adjoining ends to form a flattened mass of glass or press in which two leading-in wires are, as usual, hermetically sealed and joined to the two leads 4, which connect the leading-in wires to the ends of the filament. If the stem is not tipless the exhaust tube 2 is omitted.

For convenience an automatic transfer device may transfer the stems one by one to the mount making machine from a stem making machine, preferably one which, like the stem making machine shown in U. S. Patent 1,655,141, automatically performs all of the stem making operations except loading the leading-in wires. The stem making machine X, of which only a portion is shown in the drawings, is placed with its delivery position K adjacent the loading position of the mount making machine. This automatic stem transfer device consists essentially of an arm 11 swinging horizontally on a vertical axis 12 to carry on its free end a stem from the delivery position K of the stem making machine to the leading position A of the mount making machine.

The mount making machine has a table or frame 10 on which several stem heads for receiving and holding each stem transferred from the stem machine, are mounted to move bodily and carry the stem along a predetermined path into operative relation to the various mechanisms which perform the successive steps of mount making. The machine shown in the drawing has nine stem heads, but a greater or less number may be used. Each stem head has a stem holder comprising stem jaws 13 on the lower end of a vertically movable yoke with guide rod $13a$ having on its upper end a head $13b$ with a radial locking pin $13c$. Each yoke is carried on the overhanging end of a bracket 14 with a tubular lug $14a$ in which the guide rod $13a$ slides and also rotates. Each yoke is raised and lowered by a yoke lifter 15 slidable in the bracket 14 and having on its overhanging end an annular lifting and locking collar $15a$ which engages the head $13b$ of the guide rod $13a$ while raising and lowering the yoke and which has locking lugs $15b$ on its upper side to engage the pin $13c$ and lock the yoke against rotation, as shown in Fig. 4, while it is being raised and lowered. The collar $15a$ has a bore large enough to pass over the lug or journal $14a$ and when lowered below its normal locking position into the unlocking position indicated in dotted lines in Fig. 4 where the head $13b$ rests upon the upper end of the journal $14a$, leaves the stem yoke free to rotate because the locking lugs $15b$ are out of engagement with the pin $13c$. The brackets 14 are mounted on the rim of an intermittently rotatable spider or carrier 16 on the upper end of a vertical drive shaft 17 which extends through the table 10 and is intermittently rotated by intermittent gearing of the usual type underneath the table.

At the loading position A in Fig. 1, each stem head stops, the clutch jaws 13 are opened by means not shown in the drawing and the automatic transfer device places a stem from the stem making machine in the clutch jaws, which close and hold the stem during all of the subsequent mount making operations. After placing the stem in the stem head the automatic transfer device releases it and returns to pick up another stem. An automatic stem transfer device is not essential, as an operator at the leading position A may take the stems from the stem machine by hand and place them in the stem head.

The spider 16 now rotates one step in the direction of the arrow in Fig. 2. During this step the stem holder, by the lifter 15 and a cam not shown, is raised and then lowered automatically at the working position B to present the stem in the holder to a hook bending mechanism which bends the free ends of the leads 4 into hooks for receiving the ends of the filament.

The hook bending mechanism, shown in perspective in Fig. 5, and mounted on the table 10 at working position B comprises a pedestal 18 having on top a horizontal block 19 with its forward end formed as an anvil having vertical sides on which the leads 4 rest and a vertical groove 20 for receiving the cane 3, as best shown in Fig. 7. On top of the block 19 are guide pins 21 which control by a slot 22 a reciprocating slide 23 with a cross bar at one end and having the general shape of the letter T. A notch 24 in this cross bar registers with the groove 20 when the slide is advanced, and notches 25 on the inner sides of the cross bar near the stem of the slide receive the leads 4. The other end of the slide 23 has a cam roller 26 which is held against a cam 28 on the upper end of a shaft 27 by a spring 29. When the slide 23 is advanced to bring the notch 24 into registry with the groove 20 and the stem is lowered into the hook forming mechanism the cane 3 of the stem enters the vertical groove 20, the leads 4 rest in the grooves 25 of the cross bar, and when the slide retreats the leads 4 are bent back into the hook bending position shown in Fig. 6.

The slide 23 is actuated through the shaft 27 by an arm 31 with a cam roller 30 held in engagement with a master cam 32 by a spring 33, as best shown in Figs. 11 and 12. The master cam which actuates all parts of the hook bending mechanism in proper sequence has a raised portion 34 and a depressed portion 35. When rotation in the direction of the arrow 36 brings the raised portion 34 of the cam under the roller 30 a recess 37 in the cam 28 receives the cam roller 26 and the slide 23 retreats, as shown in Fig. 6. As the depressed portion 35 of the cam 32 comes under the roller the shaft 27 turns under the pull of the spring 33, and turns the cam 28 enough to advance the slide 23 against the spring 29 into the position shown in Fig. 5.

The master cam is driven from a worm 39 in mesh with a worm gear 38 on a shaft 40, which carries on its upper end the master cam 32. The worm 39 is connected through its shaft 41 with any suitable source of power not shown.

The hook benders for bending the ends of the leads 4 into hooks for receiving the ends of the filament comprises slidable mandrel rods 42, which, as best shown in Fig. 8, have their rear ends in guides 43 on each side of the block 19 and their front ends in cups 45 rotatably mounted in journals 44 on the block 19. A longitudinal slot 46 in each guide 43 receives a pin 47 projecting from the rod 42 which carries a collar 48 to move it endwise. Each cup 45 is rotated through a pinion 49 of which the cup 45 is in effect the hub. The bottom of this cup or hub 45 is flush with the forward end of its journal 44, and has a central hole 51 and a projecting bending pin 52 eccentric to the hole 51. A mandrel needle 53 on the end of the rod 42 slides in the hole 51 and is normally held with the pin 53 withdrawn into the hole 51, as shown in Fig. 8, by a spring 54 but projects through the bottom of the cup as is beside the pin 52 when the rod 42 is advanced. The rod 42 is advanced by a bell crank 55 engaging the collar 48 and rocked from a push rod 56 with an arm 57 carrying a post 58 to engage one end of the bell crank. The push rod 56 on its upward movement advances the mandrel rod 42 against the spring 54 until the needle 53 projects from the end of the cup 45, the space between the needle and the eccentric pin 52 being sufficient, as shown in Figs. 6 and 8, to receive the lead 4.

The hooks on the ends of the leads 4 are formed as the sleeve 45 rotates and the pins 52 bend the leads around the needles 53 as mandrels. As the mandrel rods 42 advance the cups 45 are rotated by actuating mechanism mounted symmetrically on opposite sides of the block 19 and controlled by the push rod 56 and comprising sector gears 59 in mesh with the pinions 49 on the cups 45 and mounted on pivots 60 on the pedestal 18. Each sector gear has an arm with a slot 61 into which extends a pin 63 on the end of an actuating lever 62 pivoted on the pedestal 18 with its free end engaged by an adjustable post 64 on a cross bar 65 on the upper end of the push rod 56. In its upward movement the bar 65 rocks the lever 62 and turns the sector gears 59, thereby rotating the cups 45 and bringing the parts into the hook bending position shown in Fig. 7, while on its downward movement the cups 45 and associated parts return to their original position. The cross bar 65 is raised by the push rod 56 against the tension of the coil springs 66 between the cross bar 65 and the pedestal 18 and also of the coil spring 67 between the upper one of two parallel guide brackets 68 for the push rod 56. A guide arm 69 on the rod 56 with a guide post 70, which fits loosely in a vertical hole in the upper bracket 68, as shown in Fig. 7, prevents rotation of the push rod 56.

The ends of the leads are sometimes flattened before being bent into hooks and in such cases a lead flattening mechanism may be incorporated in the hook forming head, as shown in Fig. 5, to flatten the ends of the leads as at working position B they lie on the anvil formed by the head of the block 19. To this end flattening jaws 71 are mounted on the pedestal 18 on studs or pivots 72 with flattening faces 73 on the adjustable studs 74 in their ends. These faces 73 as shown in Fig. 9, are substantially parallel with the faces of the anvil on the block 19 when the jaws are closed. The clamping jaws 71 are closed by a toggle connected by pins 75 to the forked lower ends of the jaws, and comprising, as shown in Fig. 5, two links 76 with their outer ends on the pins 75 and their inner ends joined by a pin 77 secured in a vertically movable head 78 which as it rises straightens the toggle and thereby closes the jaws 71. The head 78 is guided by a guide rod 79, and also has a guide groove 80 which fits over a vertical guide bar 81 depending from the pedestal 18, which has a projecting lug 82 for guiding the rod 79.

To actuate the push rod 56 and the hook bending parts controlled by it the master cam 32 has in its face, as shown in Figs. 11 and 12, a circular channel 83 in which a cam roller 84 on the lower end of the push rod 56 travels. When the roller is on the bottom of the channel the push rod 56 is in its low position where, as shown in Fig. 8, the mandrel rod 42 is retracted and the needle 53 is withdrawn inside the sleeve 45 which is in its inactive position. As the master cam 32 rotates in the direction of the arrow in Fig. 12, the inclined lift 85 on the bottom of the channel 83 raises the push rod 56 whereupon the arm 57 and rod 58 swing the bell crank 55 advancing the mandrel rod 42 against the spring 54, and causing the needle 53 on its end to project from the face of the tubular sleeve 45, as shown in Fig. 6. As the upward movement of the push rod continues the post 64 swings the sector gear 59 on its pivot and through the pinion 49 rotates the sleeve 45 into the final position shown in Fig. 7.

The lead flattening mechanism is actuated from the master cam by a circular disc 86 forming the center of the circular channel 83, a cam roller 87 fixed to the head 78 of the push rod 79 of the lead flattening mechanism and a lift 88 which as the master cam rotates in the direction of the arrow and the inclined face of the lift comes under the cam roller 87, raises the push rod 79, straightening the toggle formed by the pivoted links 76 and separating the lower ends of the flattening levers 71 to bring the press face 73 down firmly upon the ends of the leads 4 and thereby flatten them between the press faces 73 and the side of the block 19.

When the stem holder stops at working position B of Fig. 1 it is lowered until the stem is in the hook bending mechanism, as shown in dotted lines in Fig. 5, with the flare tube and exhaust tube above the block 19, the cane glass 3 in the groove 20, and the two leads 4 in the notches 25 of the slide 23. The drive shaft 41 underneath the table through the worm gearing rotates the vertical shaft 40 and the master cam 32 in the direction of the arrow 36 through one revolution, during which the lift 88 first raises the vertical rod 79 to flatten the ends of the leads, then the circular part 34 engages the roller 30 and permits the slide 23 to retreat and pull the flattened ends of the leads over against the ends of the cups 45, and finally the lift 85 raises the pushrod 56 to actuate the hook bending mechanism while the spider 17 is stationary with the stem holder at position B.

The lead flattening mechanism is shown in Fig. 5 with the cam roller 87 part way up the slope of the lift 88 and pushing up the head 78. As the cam roller reaches its top position the flattening levers 71 close on the anvil and pressing down and flattening the ends of the leads 4, and then the cam roller drops off the lift 88 upon the disc 86, permitting the coil spring around the rod 79 to push down the head 78 and open the flattening jaws 71.

As the master cam 32 continues to rotate the circular part 34 actuates the slide cam 28 on the top of the shaft 27 and permits the slide 23 to retreat as shown in Fig. 6, thereby bending the leads 4 which are resting in the notches 25 of the slide 23 and carrying their flattened ends into place on the end faces 50 of the cups 45 and beside the eccentric pin 52. The master cam 32 now raises the push rod 56 by its lift 85 and through the bell crank 55 advances the mandrel rod 42 until the needles 53 protrude from the centers of the faces 50 beside the flattened ends of the leads 4, each of which is now between a concentric needle 53 and an eccentric pin 52. The upward movement of the push rod 56 swings the lever 62 and rotates the sector gears 59, thus rotating the cups 45 through the pinions 49 and causing the projecting pins 52 to move around the needles 53 as centers, thereby bending the flattened ends of the leads 4 around the needles as mandrels and forming the hooks 5 on the ends of the leads. Now the needles 53 are withdrawn into the cups 45 by the springs 54 as the master cam 32 continues to rotate, permitting the mandrel rods 42 to resume their original positions, and the slide 23 is also returned to its advanced position as shown in Fig. 5. The leads 4 have now been bent into the position on the stem that they occupy in the finished mount, and their flattened ends have been bent into hooks for receiving the ends of the filament. The stem is now as shown in Fig. 10. The stem holder is now raised sufficiently to free the stem from the hook forming mechanism and the spider 16 moves it to the next position taking one step which carries the stem holder with the stem to the next or button forming position C. At the button forming position C the end of the cane glass rod is heated by gas burners 89 and it is then shaped into a button 6. At this position the stem holder brings the lower end of the cane rod 3 within range of the burners and the softened glass on the end of the rod is then formed into the button 6 in any suitable way as by pressing it with a vertically movable rod having in its upper end a recess or cup for shaping the soft glass into a button. This way of forming buttons is well known in the art, and the mechanism is not illustrated as it forms no part of the present invention. The anchors are inserted at the next working position D, preferably while the button is still soft and hot, although if desired other burners 89 may also be placed at position D to maintain or raise the temperature of the button during the anchor inserting operation. The button on the free end of the cane 3 may be only partially formed at working position C, as above described, and may be finished at working position D, the end of the cane being given only a preliminary heating at working position C, if the burners and the rod having a depression for forming the button are at the working position D so that the free end of the rod can be further heated and the anchors inserted either after the button has been finished or simultaneously with the finishing of the button.

Various forms of anchor inserting machines may be used, but in accordance with this invention the anchors are formed as shown in the drawings on account of the advantages such anchors offer in carrying out the subsequent mount making operations.

One anchor inserting device suitable for use in connection with a machine constructed in accordance with the present invention is illustrated in Fig. 13 and comprises radially positioned inserting and hook forming devices corresponding in number and position to the anchors to be inserted in the button 6.

For each device there is a vertical tubular post 90 on the table 10 with a window in one side near the upper end, and containing a reciprocating slide 91 with a hole 92 near its upper end to register with the window. The upper edge of this hole 92 forms a cutting blade which cooperates with the inner wall of post 90 to form a shear for cutting the anchor wire 93 which is fed by any suitable wire feeding mechanism across the upper end of the post 90, through the hole 92 in the slide 91 and out through the window along its upper edge. The slide 91 is actuated from the driving mechanism by a lever 94. A hook mandrel or shaper 95 mounted on a vertical shaft 95 swings horizontally into and out of the window immediately below the anchor wire 93 as shown in Fig. 13. When the parts are in position shown in Fig. 13 and the slide 91 is lowered the anchor wire is first cut, after which the downward movement of the slide 91 bends the end of the anchor down over the edge of the mandrel 95 at right angles, as shown in Fig. 14, until the end 9 of the anchor lies across the window in the post 90. To complete the formation of the open hook 7 a reciprocating plunger 97 is mounted to slide through the post 90, through the hole 92 in the slide 91, and on into the window below the mandrel, as shown in Fig. 15, thereby bending the end 9 of the anchor up against the under side of the mandrel and completing the formation of the hook 7. The plunger is actuated by a lever 98 driven through a sliding cam 99 from another lever 100 actuated by the driving mechanism. After the hook has been formed and the reciprocating plunger 97 has returned to its initial position the pivoted mandrel 95 swings back out of the way into the position 95' shown in dotted lines in Fig. 16. These operations have inserted the anchors in the button 6 and bent their free ends into open hooks 7.

The anchored stem is now freed from the anchoring device, preferably by a slight angular rotation of the stem holder on its shaft 13a, which swings the anchors out of and away from the posts 90. This slight angular rotation of the stem holder can take place because at this position the yoke lifter 15 is lowered into its unlocking position shown in dotted lines in Fig. 4, where the collar 15a is free from the head on the stem holder shaft 13a. By any suitable device, such as a member 101, shown in Fig. 17, mounted adjacent the pinching position D to move tangentially of the circular path of the stem holder and having a notch which receives the pin 13c when the head 13b is resting on the tubular lug 14a, and is free to rotate, a slight angular movement can be given the stem by moving the slide to the left in Fig. 17. After the stem is turned enough to make the anchor clear the posts 90 of the anchor forming device it is lifted out of the mechanism, and when high enough so that the anchors are clear, the slide 101 is moved in the opposite direction far enough to cause a projection 101a to catch the pin 13c and push it up and over the locking lug 15b and thereby return the stem holder to its original position on the yoke lifter collar 15a.

In some cases it is desirable that the anchors be bent down so as to bring the hooks 7 into a plane below the button 6 and transverse of the cane 3, as shown in Fig. 19, and in such cases an anchor bending device is provided at working position E to bend the anchors to bring them into the desired positions.

In accordance with the present invention the bending of the anchors into the form shown in Fig. 19 in order to facilitate the operation of mounting the filaments in the anchors is done by the device shown in Fig. 18 and comprising an anchor bending anvil 102 standing vertically on the table 10, and cooperating bending arms 103 normally in the position 103' shown in dotted lines, but movable in the direction of the arrow into the position shown in full lines to engage the tapered end of the anvil 102 and thereby bend the almost horizontal anchors 7' from the shape shown in dotted lines to their final shape shown in full lines, after which the bending arms 103 return to their former position shown in dotted lines. The actuating mechanism for the bending arms may be of various forms and is not here illustrated.

The stem with the anchors inserted and positioned, as shown in Fig. 19, is now lifted out of the anchor bending device, and the next step of the spider 16 carries the anchored stem to the filament mounting position F where it is lowered into operative relation to the filament mounting mechanism.

The automatic filament mounting mechanism at the working position F of Fig. 2 comprises devices for picking up one filament from a bunch of filaments, gripping the picked up filament near the ends, bending it into a horseshoe shape, and moving it bodily sidewise to place it in the hooks of the anchors and the leads where it is fastened to the leads. In the filament mounting mechanism shown in Fig. 20 these devices are combined into one mechanism with its various parts mounted on a frame work 104 on the table 10 driven by a common actuating mechanism from any suitable source of power.

The filament pick-up device for picking up filaments one by one is at the left side of the mechanism shown in Fig. 20 and is shown viewed from one side and partly in section in Fig. 21 and viewed from the other side in Fig. 22. The filaments 8 are straight coiled filaments cut to the required length and are supplied to the machine in bunches placed in a trough 105 with a V-shaped bottom and resiliently mounted upon an elastic body, such as a spring 106, between the hopper and the frame. One filament is picked up out of the bunch by a filament pick-up comprising a vacuum mouth piece 107 with an oblong slot or mouth somewhat shorter and narrower than the filament and forming part of a hollow pick-up arm 108 bodily movable up and down to bring this mouth piece into and out of the middle of the V-shaped bottom of the hopper 105. The actuating mechanism for the pick-arm and the other parts of the filament pick-up comprises a cam shaft 109 mounted on the frame 104 and driven by a pulley 110. On this cam shaft is a cam 111, shown in Fig. 22, which through a bell crank 112 with a cam roller 113 actuates a vertically movable tubular rod 114 which slides in a groove in the frame 104. The pick-up arm 108 is pivoted on the upper end of the tubular rod 114 so that and its interior is in communication with the bore of the tubular rod. A lug 115 on the frame 104 projects into the path of the vertically moving arm at a point such that it encounters a shoulder 116 on the pick-up arm 108 as said arm rises to a predetermined position, and swings the arm and its mouth piece 107 to one side of the axis of the trough toward the right in Fig. 21, thereby bringing the mouth piece 107 into the position shown in Fig. 22.

The vacuum mouth piece 107 is connected through the tubular rod 114 and the hollow pick-up jaw 108 to a rubber tube 117, which leads to pick-up valve 118 on the cam shaft 109. This valve is not shown in detail, but comprises a rotating valve disc on the cam shaft 109 and a cooperating stationary valve seat having an inlet port connected to the tube 117, a vacuum port connected through the tube 119 to a vacuum line or pump, and a vent port open to the air to connect these ports as desired or to close them. The valve disc is so designed that while the pick-up arms 108 is being moved upward from its lowermost position by the cam 111 the inlet and vacuum ports are connected to each other, and the pick-up arm and its mouth piece are connected to the vacuum. As the shaft 109 continues to rotate the cam 111 lowers the tubular rod 114 and brings the vacuum mouth piece 107 of the pick-up arm 108 into contact with a bunch of filaments in the trough 105, whereupon by virtue of the vacuum one of these filaments is picked up by the mouth piece, the size and form of which is so chosen that it will fit and pick up one filament only. The spring 106 acts as a buffer and assists the mouth piece 107 at its lowermost position to come in contact with one filament accurately and to disregard the other filament in the trough. The pick-up arm 108 with its mouth piece 107 holding one filament then rises as the rotation of the shaft 109 raises the tubular rod 114 through the cam 111, and stops after the lug 115 has engaged the shoulder 116 and swung the pick-up arm into the position shown in Fig. 22. The valve disc now disconnects the exhaust pump from the mouth piece and connects the mouth piece to the atmosphere through the vent port of the valve, whereupon the mouth piece 107 loses its vacuum and its holding power, and drops the filament into a filament setting device for setting the filament with its ends in a predetermined position.

The filament setting device is mounted to receive the filament one by one from the filament pick-up device. Filaments cut to the proper length may be set by the operator in the trough 105 with all of their ends in the proper position, but this is difficult, and therefore they are set in the trough with their ends only approximately in place. There is no assurance that some of the filaments are not moved lengthwise as the mouth piece 107 is pushed into a bunch of them while picking up one of them. Where a filament is to be placed on the anchors and the leads by first bending it into a horseshoe shape, the ends of the filaments must be arranged evenly so as to get a uniform product but displacement of the filaments lengthwise which might result in failure to connect one end to a lead must also be avoided. The purpose of the filament setting device is to set each filament in the correct position lengthwise before it is delivered to the mounting device.

The filament setting device is shown in Figs. 20 to 25, its different operating positions being more particularly shown in Figs. 23 to 25. The filament setting device is on the frame 104 and comprises a flat vertical seat 120 having a vertical groove 121 in which a rectangular slide rod 122 reciprocates, its lower end being guided by a guide 123 extending from the lower part of the seat 120. The lower part of the slide rod has a roller 124 which engages a lever for moving the slide rod up and down. On the rod 122 near its upper end is a pin 125 on which a semicircular shelf 126 is pivoted to lie flat on the seat 120 in close contact with it and to move vertically with the slide rod 122. The top face 127 of the shelf 126 is inclined toward the face of the seat 120 and has a stop 128 at one end in position to engage the end of a filament on the shelf. At both ends of the shelf are projecting ears 129 and the ear at the same end of the shelf as the stop 128 is connected by a spring 130 to the frame 104.

The slide rod 122 is actuated by a lever 131 pivoted on the frame 104 and resiliently connected at one end to the slide rod 122 by a lever 132 pivoted at one end on the lever 131 with a spring or other elastic body between it and the lever 131 to act as a buffer and with its free end in engagement with the roller 124 on the rod 122. On the other end of the lever 131 is a cam roller 133 in contact with a cam 134 on the drive shaft 109, a part of the surface of the cam 134 having teeth much like those of a spur gear to oscillate the lever 131 as the cam roller rides over the teeth. At both the upper and lower ends of the seat 120 a pair of control lugs 136 project into the path of the ears 129 on the shelf 126 to limit the vertical movement of the shelf.

A filament transfer device best shown in Figs. 26 to 29 is mounted on the seat 120 near its upper edge to receive a filament from the shelf 126 and transfer it to the next device. This transfer device comprises a pin 137 set in the side of the seat 120 or an extension of it to act as a pivot for a lever 138 which has at its upper end a filament carrying trough, later described, and on its lower end a serrated surface 139 with teeth something like saw teeth. Although the lever tends to assume the position shown in Figs. 25 and 27 because of the spring 140, it remains in the position shown in Figs. 23 and 26 with the spring 140 under tension when one of the ears 129 of the shelf 126 is in contact with its serrated surface 139. Its position relative to the pick-up device is shown in Figs. 20 to 22. The picking up device is shown in full lines in Fig. 22, and in dotted lines in Fig. 23 with its mouth piece 107 right over the filament setting device, having been swung over by the lug 115 while picking up one of the bunch of filaments. The filament pick-up arm 108 stops with the mouth piece 107 just above the top of the shelf 126 and releases the filament held by it and permits the filament to drop on to the shelf 126.

When the roller 133 on lever 131 engages the cam 134 in the position shown in Fig. 23, the rod 122 is in its lowest position and the filament held by the pick-up arm is delivered while the shelf 126 rests with both ears on the upper faces of the lower control lugs 136. As the upper face 127 of the shelf slopes toward the seat 120 the filament 8 rolls down the slope and comes to rest against the face of the seat and lies lengthwise of the shelf.

As the cam shaft 109 rotates, the slide rod 122 rises with the shelf 126 pivoted thereon, and the spring 130 connected to it at the end where the lug or stop 128 is provided for the end of the filament, is put under tension. As the ear 129 on that end of the shelf comes in contact with the serrated face 139 of the lever 138 it is retarded and consequently the shelf 126 as shown in Fig. 24, is tilted or inclined about the pin 125 at its center, and as the circular toothed part of the cam 134 is in contact with the roller 133 of the lever 131 the shelf 126 is vibrated vertically while standing inclined at this position. The filament 8 lying on the upper face of the shelf is moved lengthwise by the vibration until one end comes in contact with the lug or stop 128, so positioned as to definitely set the filament in a predetermined position on the shelf and at the place necessary for the succeeding operation the vibration keeping the end of the filament in contact with the stop and thereby setting the filament in position suitable for the next operation.

The stop or lug 128 is such a height that it will hold one filament only, and if more than one filament is on the shelf only one will be held by the stop during the operation, the rest sliding over the stop and out of the device, so as to not hinder the subsequent operations. As the cam 134 turns into the position shown in Fig. 25 the slide rod 122 moves further upward to its topmost position, and the shelf 126 carries the properly set filament to that position and delivers it to the filament transfer mechanism when both ears 129 come in contact with the lower faces of the top control lugs 136, and the shelf is straightened up into the horizontal position shown in Fig. 25.

A filament transfer device for delivering the accurately set filaments from the shelf 126 to the filament mounting device and thereby increasing the accuracy of the mounting is shown in place in Fig. 20 and the more important parts are shown on a larger scale in Figs. 27 to 29. The filament transfer device receives the filament from the movable shelf 126 of the filament setting device which rises with the filament 8 resting on its upper face from the position shown in Fig. 26 and stops in the position shown in Fig. 27, where the slope of the shelf 126 causes the filament to roll into the shallow horizontal transfer trough 141 pivoted at the upper edge of the seat 120 to rock about a horizontal axis. This transfer trough 141 is closed at both ends and is in cross section somewhat like a curved wedge, with a sharp edge and a flat radial surface 143. When the shelf 126 is in its upper position the trough 141, as shown in Figs. 27 and 28 forms an extension of the shelf as in its normal position the trough is tilted so that its sharp edge is in contact with the bottom edge of the sloping upper surface 127 of the shelf and its rear edge is raised a little so that a filament will roll off the inclined surface of the shelf into the transfer trough and will stop in the trough.

The trough delivers the filament into a filament conveyor comprising a back plate 144 pivoted on a horizontal pin 145 on the upper end of the lever 138 so that its lower edge is normally held, as shown in Figs. 26 and 28 by a spring not shown in contact with the upper flat side of a bar 146 forming an elongated bucket in which the filament will lie while being conveyed. The bar 146 extends horizontally from the lever 138 so that its vertical flat side contacts with the flat surface 143 of the transfer trough when the lever 138 is brought in its raised position, as shown in Figs. 26 and 28 by the shelf 126 dropping down after delivering the filament 8 to the transfer trough 141 and engaging the rough face 139 of the lever 138 and pushing this lever up, as shown in Fig. 25, until it is in the position shown in Fig. 26 with the lower edge of the plate 144 on the upper side of the horizontal bar 146, while the other flat side of the bar comes in contact with the flat surface 143 of the transfer trough 141 and rotates it to tilt it into a position, shown in Figs. 26 and 29, where the filament rolls down into the position shown in Fig. 29 along the line of contact between the upper face of the horizontal bar 146 and the lower edge of the plate 144.

On the flat seat 120 opposite the shelf 126 is a transfer hopper 147 with a sloping bottom in which is a set screw 148 to determine the position in which the swinging lever 138 stops as it swings into this hopper to bring its upper edge into registry with a slot 149 cut in the bottom of the hopper and so shaped that the filament can fall through it. As the sliding shelf 126 after receiving a new filament and correctly setting it on the shelf moves upward and its ear 129 is disengaged from the rough surface 139 on the lower end of the lever 138, the spring 140 swings the upper end of the lever toward the transfer hopper 147, the horizontal bar 146 and the plate 144 on the lever 138 carrying away the filament 8 received from the transfer trough 141, and as the bar 146 moves away the transfer trough 141 resumes its normal position shown in Figs. 27 and 28 ready to receive the next filament.

When the lever 138 encounters the head of the set screw 148 in the hopper 147 and comes to rest in the hopper, the upper part of the plate 144 engages a stop 150 and is swung a little about the horizontal pin 145 as an axis, causing the lower edge of the plate to move off the upper side of the bar 146 and leaving a gap through which the filament drops to the bottom of the transfer hopper and on out through the slot 149 in the bottom of the hopper into the filament mounting device of which certain parts are shown by broken lines in Fig. 27 in position to receive the filament.

The filament mounting mechanism is adjacent the pick-up device as shown in Fig. 20, and may for convenience be mounted on the frame 104. The filament mounting mechanism comprises devices for bending the filament into a predetermined shape, such as a U, or a horseshoe, or any other desired form depending on the position of the leads and anchors and the type of lamps being made, and then placing the bent filament in the anchor hooks, a device for placing the ends of the bent filament in the hooks on the leads, mechanism for closing the hooks of the leads upon the ends of the filament, and common actuating means for these devices which work in definite sequence. The common actuating means shown in Fig. 30, comprises a cam shaft 151 mounted on the frame 104 and driven from a source of power by a pulley 152. On the cam shaft 151 are five cams the two end cams 153 serving to bend the filaments into a predetermined shape such as a horseshoe, the middle cam 154 actuating the filament placing mechanism for moving the bent filament bodily and sidewise to place it in the anchor hooks, the right hand cam 155 placing the ends of the filament in the hooks of the leads and the left hand cam 156 closing the hooks of the leads. Also on the cam shaft and forming part of the mechanism is a rotary valve for controlling the bending device which grips the filament near its end, and comprises a valve disc 158 rotating with the cam shaft 151 on a stationary valve seat against which it is pressed by a spring 160. The valve seat 159 has a vent port 161 to the atmosphere, a vacuum port 162 connected to a vacuum line or pump, and an inlet port 163 connected to tubular pins for gripping the filament. The position of the valve 158 determines how these ports are connected.

The filament shaping device comprises a filament shaper which bends the filament into the desired form and then moves it bodily sidewise to the hooks of the stem, comprises a lever 164 having on its upper end the bending device for gripping the filament near its ends and bending it into shape. This lever is pivoted on a horizontal pin 165 extending across the frame 104, with a cam roller 166 on its lower end to ride on the cam 154 and swing the lever 164 to and fro as the cam rotates. The limits of this swing are shown in Fig. 32 by the broken lines extending radially upward from the pin 165, the line 167 showing the extreme left position where the filament is received from the filament transfer mechanism, and the line 168 showing the extreme right position where the filament is placed in the hooks on the stem.

The filament holding and bending mechanism is shown more in detail in Figs. 30 and 34. Set crosswise on the upper end of the lever 164 is a head 169 made of a rectangular block having a deep channel cut across each end, as appears in Fig. 31, so that when viewed from the side and along its direction of bodily movement the head is shaped something like the letter H. On the upper side of the head is cut a square groove which, with a cover plate 170, forms a square channel or guide extending lengthwise of the block and transversely of its direction of bodily movement. In this channel two blocks or slides 171 can slide freely but are normally pushed outward and away from each other by an interposed spring 172. Each slide 171 carries a tubular filament holding pin 173, which extends above and below the slide and is mounted in it to rotate and also move vertically. Each of these tubular filament holding pins 173 projects up through a slot 174 in the cover plate 170 and down through a corresponding slot 177 in the head 169, as shown in Fig. 31, and has in its upper end a V-shaped notch 175 into which the filament to be held is dropped. The tubular filament holding pins are connected at their lower ends through rubber tubes 176 to the inlet port 163 of the rotary valve, and thus a vacuum may be produced in the pins 173 to hold the filament firmly in place in the notches 175. On each tubular filament holding pin 173 a collar 178 is fixed below the slide 171 to be in the channel in the end of the head 169. Between the collar 178 and the slide 171 is a coiled spring 179 with its ends fastened to the collar and to the slide so as to align the V-shaped slot 175 in the end of the tubular holding pin with the direction of movement of the slide 171. To rotate the tubular filament holding pin against the tension of the spring a pin 180 projects from the collar 178 and engages with a projection from the frame 104 as the lever swings the head 169 bodily to and fro.

Where the filament is to be bent into a horse-shoe shape an anvil lug 181 is provided on the upper side of the cover plate 170 near the front and to prevent the drooping of the shaped filament at the bend, a tongue 182 projects from the back of the cover plate at practically the level of the cover plate, but slopes downward sharply at the remote end to facilitate engagement with a filament receiving plate.

The top of the frame 104 has parallel walls 183 between which the head 169 on the lever swings with its ends touching both walls. As seen in Fig. 31, there is on the inside of each wall an upper control rail 184 in contact with the end of the slide 171, and a lower control rail 185 in contact with the rim of the collar 178 on the tubular filament holding pins 173. The lower rail serves to rotate the tubular pin 173 by engaging the projecting pin 180 of the collar 178.

In the bending of the filament into a horseshoe shape the slides 171 are moved toward each other horizontally and transversely of the direction of the swing of the lever 164 during the forward swing of the lever by slide actuators on the walls of the frame as shown in Figs. 30, 32 and 33. As the actuators on both walls are alike those on only one side will be described. The slide actuator on each wall comprises a pair of projecting lugs 186 bored through lengthwise to form two cylindrical guides 187 and 188 positioned as shown in Fig. 32, at both ends of the swing of the lever 164, that is, on the broken lines 167 and 168 so as to be in registry with the outer end of the slide 171. In those guides are plungers 189 and 190 with caps 191 and 192 engaged by springs 193 and 194 which normally draw the plungers out of the guides until their inner ends 195 and 196 are either flush with or somewhat below the inner surface of the wall 183.

The plungers are moved inward by actuating mechanism on a bracket 197 on the outside of the wall 183, as shown in Figs. 30 and 33, and comprising a bar 198 extending crosswise of one end of a bell crank 199 on a pivot 200 and having near its ends set screws 201, 202 to engage the plunger caps 191 and 192, which preferably have sockets to receive the ends of the set screws. The other end of the bell crank is connected by a rod 203 having spherical ends forming the balls of the ball and socket joints, with a bell crank 204 having a socket for the ball 205 of the rod 203. The bell crank 204 is pivoted on the pin 165 and is actuated through a cam roller 206 from one of the cams 153 on the shaft 151.

The mechanism on the other wall is of the same construction and in the same manner is actuated from the other cam 153. Since the two cams 153 are of the same contour and are set on the shaft the same way they impart to the mechanism connected to them the same motions, but in opposite directions. The slides 171 move inward toward each other and the center line between the walls and outward in the opposite direction and away from each other.

As appears from Fig. 33 each cam 153 is a three stage cam, the roller 206 being shown in Fig. 33 on the first stage, where the springs 193 and 194 are extended and the plungers 189 and 190 are retracted so that their inner ends are at least flush with the inside of the wall 183. At the second stage the inner ends of the plungers 189 and 190 are pushed inward until their inner ends 195 and 196 project beyond the inner surface of the wall and are flush with the rails 184. At the third stage the plungers 189 and 190 are pushed still further inward.

The two slides 171 carried by the head 169 are pushed apart by the spring 172 so that when the lever 164 is in the position shown by the broken line 167 of Fig. 32, their outer ends are against the inside of the wall, and are also directly over or in registry with the inner ends 196 of the plungers 190. The plungers 190 are pushed inward until their inner ends 196 and also the outer ends of the slides 171 are flush with the rails 184, whereupon the swing of the lever 164 first carries the pushed in slides onto the rails 184, which keep them pushed in, and then along the rails to the end of its travel into the position shown by broken line 168, where the ends of the slides are in registry with and rest on the inner ends 195 of the plungers 189 which are flush with the rails and are then pushed still further inwardly, pushing the slider so much further inward that the upper ends of the tubular filament holding pins 173, which are carried on the slides 171 and project up through the slots 174 in the cover plate 170, reach the inner ends of said slots.

Figure 37:
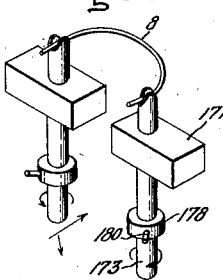
Figure 38:
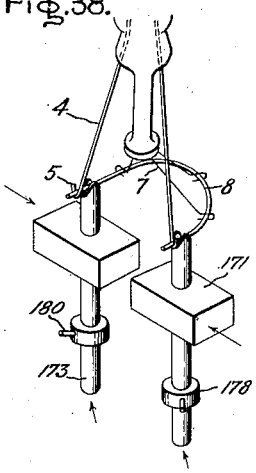
Figure 39:
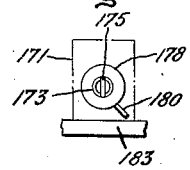
Figure 40:
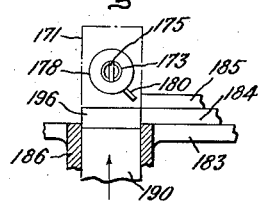
Figure 41:
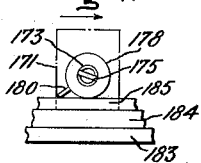
Figure 42:
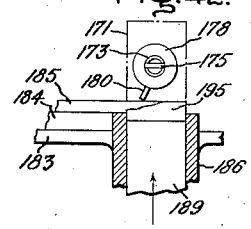
Figure 43:
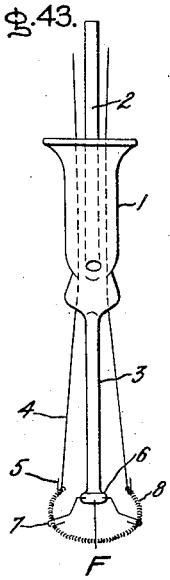

The turning of the tubular filament holding pins 173 which occurs during the swinging movement of the lever 164 is shown in Figs. 35 to 42, and is brought about by the rails 185 engaging the projecting pins 180 on the collars 178 fixed on the tubular filament holding pins 173. The angular relation between the pin 180 and the notch 175 in the top of each tubular filament holding pin 173 is of importance, and must be practically that shown in the drawing, although it may vary somewhat according to how far the rails 185 project, the length of the pin 180, and the other factors. When the notches 175 in both tubular filament holding pins are brought into line by the springs 179 the pins 180 are in the position shown in Figs. 35 and 39. When the slides 171 are pushed inward and the lever 164 swings to the right and brings the outer end of the slides onto the rail 184, the pins 180 come in contact with the ends of the rails 185, turn the tubular filament holding pins into the position shown in Figs. 37 and 41 about 90 degrees away from the original position, and hold them turned as the collars 178 slide along on the rails as the lever continues its swing to the right. When the lever stops in the position shown by the broken lines 168 and the slide 171 is pushed further inward by the inner end 195 of plunger 189, changing the relative position of the pin 180 and the rail 185 the tubular filament holding pins may turn back a little, as shown in Figs. 38 and 42, and make the direction of the slot more nearly parallel to the direction of the swing of the lever although such a position is not always necessary.

The tubular filament holding pins 173 are raised and lowered by the holding pin reciprocating mechanism best shown in Figs. 31, 32 and 34, and comprising a curved lifting plate 207 pivoted at one end to the frame and rocked on its pivot by a connecting rod 208 which connects the other end to a bell crank 209 pivoted on the horizontal pin 165 and actuated by the cam 155 on the cam shaft 151 through a cam roller 215. In the curved plate 207 is a middle channel 210 in which the lever 164 swings, and also two side channels 211 parallel with the sides of the plate and bent at right angles at their ends. The tubular filament holding pins 173 are loosely set in these side channels, and have fixed on them washers 212 which are held against the plate by springs 216.

As best shown in Figs. 32 and 34, the connecting rod 208 is connected at one end to a horizontal stud 213 fixed in the curved plate 207 and at the other end by a pin 214 to the bell crank 209 actuated by the cam 155.

The cam is shaped to act in four stages as appears from Fig. 32 in which the roller 215 is shown on the first stage of the cam; in the second stage the roller moves to the right as it drops into the recess forming the second stage; in the third stage, of the same height as the first stage, it comes back to the position shown in Fig. 32, and in the fourth stage it swings to the left as it rides over a lift, and then comes back to its original position. When the roller 215 is on the first stage of the cam 155 the curved plate 207 is on an arc drawn about the pin 165 as a center and the tubular filament holding pins 173 are in the position shown in Fig. 32, but as the lever 164 swings into the position shown by the broken lines 168 the roller 215 reaches the second stage of the cam 155, where the bell crank 209 swings counterclockwise and raises the free end of the curved plate 207 through the connecting rod 208 pushing the tubular holding pins 173 up through the slides 171 until their upper ends project above the cover plate 170. When the cam roller 215 is on the third stage of the cam the tubular filament holding pins drop down to their position shown in the drawings, and when the roller is on the fourth stage of the cam the filament holding pins drop down still lower until their upper ends are almost flush with the surface of the cover plate.

The filament clamping mechanism for fixing the ends of the filament in the hooks on the leads is mounted at the right hand end of the frame 104, above the cam shaft 151, as shown in Fig. 20. The mechanism also shown in Fig. 30, and in more detail in Fig. 44, comprises tubular guides 218 with bore 217 fixed on the upper edges of the walls 183 parallel with and vertically above the guides 186 and plungers 189 and in alignment with the lug 181 on the cover plate. Pinching jaw 219 which cooperates with the ends of the lug 181 to close the lead hooks are secured to the inner ends of plungers 220 having caps 221 in their outer ends and slidable in the guide. The pinching jaws 219 are normally held flush with the end of the guides 218 by springs 222 engaging the caps 221. The lower side of the plungers 220 rest on the cover plate 170, while the face of the pinching jaw 219 is in registry with the end of the lug 181 on the cover plate 170. On a bracket 224 fixed on the frame 104 just above the cam shaft 151 by studs 223 are grooved guides 225, face to face, in form something like an inverted letter U, and in which a block 226 slides vertically. On the top of this block 226 is a hook closing cam or head 227 with sloping cam or operating faces 228 on both sides, and on its bottom edge is a leg 229 having on its end a cam roller 230 which is kept in contact with the cam 156 by the weight of the block 226, or by a spring if desired. On the ends of the bracket 224 are two vertical journals 231 for vertical shafts 232, each with an upper arm 233 which engages a plunger 220 and a lower arm 234 cooperating with the cam faces of the head 227 and held there by the springs 222.

The hooks on the leads in the stem are brought into position between the pinching jaws 219 and the ends of the lug 181 on the cover plate, as shown in Fig. 30, and when the pinching jaws are pushed inwardly, the hooks are pinched and closed on the ends of the filament, thereby attaching the filament to the leads. This operation occurs during one revolution of the cam 156, which has one lift 237. As the roller 230 rides up on the lift 237 the sliding block 226 and the cam head 227 rise, the sloping cam faces 228 of the cam head swing the free ends of the arms 234 away from each other and bring the ends of the arms 233 toward each other, thereby moving the plungers 220 inwardly in the guides 218 against the springs 222 and causing the pinching jaws 219 to emerge from the guides 218 far enough to close the hooks on the leads down on the filament. The relative position of the pinching jaws 219, guide 218, and the head 169 of the swinging lever 164 is shown in Fig. 30.

The cycle of the operation of the filament mounting device, part of which is controlled by the cams on the constantly rotating cam shaft 151 so as to operate in a predetermined sequence is as follows: When the lever 164 is at the left of Fig. 32, shown in the broken line 167 and in the position also shown by the broken line in Fig. 27, a filament is picked up from the bunch of filaments in the receptacle 105, properly set on the shelf 126, rolled off the shelf into the filament transfer trough 140 on lever 138, and delivered by the filament conveyor to the hopper 147, where it drops down through the slot 149 in the bottom of the hopper. At this time the notches 175 in the upper ends of the tubular filament holding pins 173 are in alignment with and just below the slot 149 and receive the filament as it is dropped out of the hopper. In order to make this action more definite a cover, not shown, may be provided for the slot 149 to cover it constantly except when the lever 164 reaches the position in which the filament is received, and while it is in that position the cover plate is opened to drop the filament, which is normally prevented from falling out of the slot into the notches on the upper ends of the tubular filament holding pins 173.

As the lever 164 reaches this position at the left end of its swing the valve on the shaft 151 connects the vacuum port 162 to the inlet port 163, which in turn is connected to the tubular filament holding pins 173 whereby a partial vacuum is produced at the upper ends of the tubular filament holding pins and consequently the filament in the notches on the pins is firmly held to them.

Figure 35:
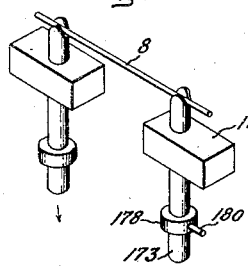
Figure 36:
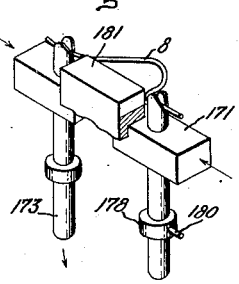

In this position the direction of the notches and the position of the slides 171 are shown in Fig. 35. The notches are in a straight line and the slides are separated from each other, with their outer ends in contact with the walls 183. The cams 153 now bring their second stage into contact with the rollers 206, pushing the plungers 190 inwardly and pushing the slides 171 away from the wall, until their outer ends are in alignment with the surface of the rails 184. The tubular filament holding pins 173 are also carried toward each other by the movement of the slides and bend the filament 8, held in the notches 175, as shown in Fig. 38, the direction in which the filament is bent being determined by the lugs 181 on the cover plate.

The cam 154 now swings the lever 164 from the left to the right in Fig. 32, moving the outer ends of the slides 171 off the inner ends of the plungers 190 and on to the rails 184, so that the slides will not separate or move away from each other as they travel along the rails during the remainder of the swing of the lever 164, but about this time the pins 180 in the collars 178 on the tubular filament holding pins 173 encounter the ends of the rails 185 and move into the position shown in Fig. 41, turning the tubular filament holding pins during the swing of the lever so that the notches in the top of the pins turn through to an angle of about 90 degrees. These movements bend the filament gripped near its ends by the tubular filament holding pins into the shape of a horseshoe, as shown in Figs. 31 and 37, the loop or bend resting on the tongue 182. When the lever 164 reaches its extreme position at the right, as shown by broken lines 168 in Fig. 32, this loop of the bent filament supported on the tongue 182 of the cover plate 170 slides onto and is supported by a filament shelf 238 mounted in a position to overlap the tongue 182.

The stem held in working position F of Fig. 2, has the open ends of the hooks 7 of the anchors in registry with the filament shelf 238, as shown in Fig. 32, and the hooks 5 on the leads 4 are in contact with the opposite ends of the lug 181 on the cover plate, as shown in Fig. 30.

The bent part or loop of the filament bodily moved sidewise onto the filament shelf 238 slides into and is accurately placed in the hooks of the anchors 7, as shown in Fig. 38. The stem shown has three anchors, but filaments can be mounted, in accordance with the present invention, in stems having a different number of anchors. In the device shown in the drawing the tubular filament holding pins 173, each holding the filament near the end, are brought into place outside of the hooks 5 on the leads 4 so that the filament is now in place in the anchors, but its ends are not yet clamped to the leads.

The ends of the filament are now lifted up over the ends of the two hooks 5 and then lowered into those hooks so that the hooks can be closed and thereby the leads clamped to the filament. When the lever 164 stops in the mounting position on the broken line 168 in Fig. 32, the cam 155 by its second stage lifts the filament ends by swinging the curved plate 207 upward about its horizontal shaft 213 through the bell crank 209 and the connecting rod 208, and lifting with it the tubular filament holding pins 173, which are raised with the filament supported in them until they are a little above the free ends of the hooks of the leads. Next the cams 153 by their third stage push the plungers 189 further inward, but since the outer ends of both slides 171 are now resting upon the inner ends of the plungers 189 which pass through the rails 184, the plungers are pushed in further and move inwardly until each tubular filament holding pin 173 reaches the inner end of the slots 174 in the cover plate 170, attaining a position where the ends of the filaments supported on the pins are just above the openings of the hooks of the leads. The cam 155 now by its third stage lowers both the tubular filament holding pins 173 by returning the curved plate 207 to its former position, whereupon the ends of the filament 8 held in the notches 175 of the tubular filament holding pins are lowered into the hooks on the leads, as shown in Fig. 30. Next the cam 156, as shown in Fig. 44, raises the cam head 227 and by its cam surfaces 228 swings the arms 233 toward each other moving the plungers 220 inwardly, gripping the hooks of the lead wires between the pinching jaws 219 and the ends of the lug 181 and closing the hooks, thereby clamping the leads holding firmly to the ends of the filament, after which the cam head 227 drops back and the plungers 220 resume their original position. Now the filament is released as the inlet port 163 connected through the rubber tube to the lower ends of the tubular filament holding pins 173 is connected by the valve to the vent port 161, which is open to the atmosphere, causing the tubular filament holding pins to lose their power of holding the filament by vacuum. In the present embodiment of the invention the holding of the filament in the heads of the tubular filament holding pins is due to vacuum, but of course the ends of the filament may be held by other well known devices for holding filaments. The cam 155 now by its fourth stage further lowers the curved plate 207 and with it the tubular filament holding pins, which are entirely separated thereby from the filament.

The lever 164 after the plungers 189 return to their former position now begins its return swing and the head 167 returns to its position for receiving the next filament. The filament has now been placed accurately in the anchor hooks 7 and its ends have been clamped to the leads 4, the filament secured to the ends of the leads, and the stem, as shown in Fig. 43, the stem holder is raised out of the filament mounting mechanism and the spider 17 takes another step in its rotation, carrying the stem to the next working position G, where it stops in operative relation to the hook closing device for the next operation of closing the anchor hooks around the filament.

The anchor hook closing device at working position G is preferably constructed to bend the hook 7 of the anchor into a loop around the filament making the hooks more complete and thereby improve their grip on the filament, to prevent the filament falling out of the hook.

The free ends of the hooks on the anchors need not necessarily be made exactly as shown in the drawings as other ways of closing the hooks may be used if desired, but the methods of closing the hooks shown in Figs. 45 to 48 are suitable for forming closed loops by winding the free end 9 of the anchor hook around the filament. The anchor hooks closing device shown in the drawing comprises several hook closers mounted on the table 10 to extend radially from a vertical post 239 as a center, the number of these hook closers being equal to the number of anchors on the stem. The vertical post 239 has a collar 240 near its upper end, and is in alignment with the axis of the cane 3, of the stem in the stem holder. The top of the post 239 is shaped to hold the button 6 on the cane 3 when the stem stops at working position G. Each hook closer comprises a rectangular pedestal 241 set on edge to extend radially from the vertical post 239 as a center on its upper edge and having a horizontal guide 242 and a vertical guide 243. In the vertical guide 243 is a push rod 244 with a hook bending lug 245 on its upper end and its lower end connected to an actuating lever 246 rocked by a cam 247 through a cam roller 248 held against the cam by a spring 249. In the horizontal guide 242 reciprocates a slide 250 having in its end a vertical slot 251 open at one side to make a bending hook 252. At the other end of the slide is a projection 253 which engages with a pin 254 projecting from the side of the cam 247. As the cam rotates the pin encounters the projection and moves the slide backward or away from the vertical post 239, and when they are out of engagement the slide is moved forward or towards the vertical post by a spring. The collar 240 at the upper end of the vertical post 239 has its upper surface at the same level as the upper edge of the vertical guide 243 and upon this collar rests a conical anchor die 255 having radial anchor grooves 256 cut in its sides to receive the anchors as shown in Fig. 46, which also shows the position of the slides at the beginning of the hook closing operation.

When the spider brings the stem holder to the working position G the slides 244 and 250 are drawn back out of the way. When the stem in the holder is lowered each anchor sinks into an anchor groove 256 on the anchor die, and the button 6 on the cane rests on the upper end of the vertical post 239. The projection 253 is released by the pin 254 and the slide 250 is advanced by the spring 257 until its end is in the position shown in Fig. 46, over the top part of the hook 7 of the anchor and in registry with it.

The cam 247 now raises the slide 244 causing the projection 245 on the end of the slide to encounter the free end 9 of the anchor hook and push it up into the slot 251 in the slide 250, the end of the slide 244 acting somewhat like a bending die to curl the end of the anchor hook into the position shown in Fig. 47, but at this moment the pin 254 on the cam 247 encounters the projection 253, moving the slide backward and causing the hook 252 on its end to catch the free end 9 of the anchor hook, and pull it down as shown in Fig. 48, thereby bending it around into a loop around the filament.

The description so far given applies to only one of the hook closers but there are as many such hook closers as there are anchors, and the free ends of all the anchor hooks are bent around the filament to form closed loops at the same time and in the same way.

The closing of the anchor hooks finishes the mounting of the filament on the stem, which is now as shown in Fig. 49, and on the next step of the spider 17 is taken from the working position G to the working position H indicated in Fig. 2, where it is removed from the machine after being freed from the stem holder by the operator at the delivery position. If desired an automatic device can be provided at the delivery position for taking the finished mount out of the stem holder at the delivery position H.

The working position J in Fig. 2 is not always necessary, as it is merely an extra or auxiliary position to provide for the possibility that the operator is not able to remove the finished mount at the delivery position H in the time available in which case the extra working position J gives the operator ample time to remove the finished mount without stopping the machine.

The operation of the machine as a whole will be evident from the description of the operation of various parts. In general, a stem with straight leads, as shown in Fig. 1, is moved bodily and step by step along its path and presented to the various mount making devices in succession, first to a hook forming device where the ends of the leads are flattened and bent into hooks, and then to a button forming and anchor inserting device which makes a button on the end and inserts the anchors, bending the free ends of the anchors into open hooks. The filament for the stem is picked up from a bunch of coiled filaments of the right length set accurately on a vertically movable shelf from which it rolls into a filament transfer device that delivers it to the filament mounting device through a chute which defines very accurately the position of the delivered filament. The stem with the inserted anchors is presented to the filament mounting device comprising two filament holding pins which grip the straight coiled filament near the ends, move toward each other to bend the filament into a horseshoe shape, then move bodily sidewise to place the horseshoe shaped filament in the anchor hooks, then rise, move further toward each other to carry the projecting ends of the filament into position above the open hooks on the leads, and then drop down to lower those ends into the hooks and release the filament, after which the lead hooks are closed to clamp the leads to the ends of the filament. The stem then moves to a hook closing device which closes the anchor hooks around the filament and the mount is finished.

The mechanism shown in the drawings is only one form of embodiment of the present invention, and various modifications and changes can be made without departing from the spirit of the invention.

What I claim as new and desire to secure by Letters Patent of the United States is:

1. A mount making machine for incandescent lamps and similar articles comprising a stem holder bodily movable along a predetermined path, anchoring mechanism at one point of said path for providing the lower end of a stem held in said holder with anchors having hooks which are below and disposed about said end so as to open toward the axis of said stem, a filament placing mechanism at another point of said path for bending a filament to fit into said hooks and placing it therein, and common actuating means for moving said stem holder into registry with said mechanisms in succession and actuating each mechanism while said stem is in registry with it.

2. A mount making machine for incandescent lamps and similar articles comprising a stem holder bodily movable to carry along a predetermined path a stem having radial anchors at its lower end and leads with their free ends adjacent said anchors, mechanism for bending the free ends of said leads and of said anchors into open hooks disposed about the axis of said stem as a center with said anchor hooks open toward said axis, a filament placing mechanism at another point of said path for bending a filament to fit into said hooks and moving said bent filament bodily sidewise to place it in said open hooks, and common actuating means for moving said stem holder into registry with said mechanisms in succession and actuating each mechanism while said stem holder is in registry with it.

3. A mount making machine for incandescent lamps and similar articles comprising a stem holder bodily movable along a predetermined path to carry a stem having radial anchors at its lower end and leads with their free ends adjacent said anchors, mechanism for bending the free ends of said leads and of said anchors into open hooks disposed in the form of a horse shoe about the lower end of said stem as a center with said anchor hooks open toward the axis of said stem, a filament placing mechanism at another point of said path for bending a filament into a horse shoe shape to fit into said hooks and moving said bent filament bodily sidewise to place it in said open hooks, and common actuating means for moving said stem holder into registry with said mechanisms in succession and actuating each mechanism while said stem holder is in registry with it.

4. A mount making machine for making incandescent lamps and similar articles comprising a stem holder bodily movable to carry along a predetermined path a stem having radial anchors at its lower end with open hooks disposed about the lower end of said stem as a center with said anchor hooks open toward the axis of said stem, a filament placing mechanism at a point of said path comprising two filament holders mounted side by side to be movable toward and away from each other and to rotate on their longitudinal axes, said holders being normally spaced apart a distance such as to enable them to engage a straight filament near its ends, means for moving said holders bodily toward each other and also turning them on longitudinal axes to bend a straight filament held by them into a curve, and means for moving said holders bodily to carry said bent filament sidewise into the open hooks of the anchors on a stem in said holder.

5. A mount making machine for incandescent lamps and similar articles comprising a stem holder bodily movable to carry along a predetermined path a stem having radial anchors at its lower end with open hooks disposed about the lower end of said stem as a center with said anchor hooks open toward the axis of the stem, a filament placing mechanism at a point of said path comprising two tubular filament holding pins mounted side by side to be movable toward and away from each other and to rotate on their longitudinal axes and with their adjacent ends notched to receive a filament, said holders being normally spaced apart a distance such as to enable them to engage a straight filament near its ends, means for maintaining a vacuum in said holders to hold the filament in said notches, means for moving said holding pins bodily toward each other and also rotating them to bend a straight filament held by them into a curve, and means for moving said holding pins bodily side wise to carry said bent filament sidewise into the open hooks of the anchors on a stem in said holder.

6. A mount making machine for incandescent lamps and similar articles comprising a stem holder bodily movable to carry along a pre-determined path a stem with anchors having hooks disposed so as to open toward the axis of said stem, a filament placing device adjacent said path comprising two filament holders relatively movable to bend into a curve a filament gripped by them near its ends, a transfer device for delivering said filament to said holder and bodily movable to carry said bent filament bodily sidewise into place in said open hooks, a filament setting device for setting a straight filament with its ends in predetermined position, and common actuating means for said devices and for said stem holder.

7. A mount making machine for incandescent lamps and similar articles comprising a stem holder for a stem with anchors having hooks open toward the axis of said stem, a filament placing device for gripping a straight filament near the ends, bending it into a curve, and moving said bent filament bodily sidewise to place it in said open hooks, a filament pick up device for picking one filament up out of a bunch, a filament transfer device for delivering said picked up filament to said filament placing mechanism, and common actuating means for actuating said devices in sequence.

8. A mount making machine for incandescent lamps and similar articles comprising a stem holder for a stem with anchors having hooks open toward the axis of said stem, a filament placing device for gripping a straight filament near the ends, bending it into a curve, and moving said bent filament bodily sidewise to place it in said open hooks, a filament pick up device for picking up one filament from a bunch, a filament setting device adjacent said pick up device to receive the picked up filament and set it in a predetermined relation to said filament placing device, a filament transfer device for delivering the set filament to said filament placing device in a predetermined position, and common actuating means for said devices.

9. A mount making machine for incandescent lamps and similar articles comprising a stem holder bodily movable to carry along a predetermined path a stem having a pair of leads, a hook bending device in said path for bending the free ends of said leads into hooks open in the same direction and below the end of the stem, an anchoring device in said path for inserting anchors radially disposed about the lower end of said stem as a center and having hooks open toward the axis of said stem, an anchor bending device for bending said anchors to bring said anchor hooks below the end of the stem and into the plane of the lead hooks, and common actuating means for moving said stem holder into registry with said devices in succession and actuating each device while said stem holder is in registry with it.

10. A mount making machine for incandescent lamps and similar articles, comprising an intermittently rotatable carrier, stem holders mounted on said carrier to carry along a predetermined path a stem having a pair of leads and a glass arbor, a hook bending device adjacent said path for bending into hooks the free ends of leads presented to it, an anchor inserting device adjacent said path for inserting radial anchors in the stem arbor at its lower end with open hooks disposed about said arbor as a center and open toward the axis of said stem, a filament placing mechanism adjacent said path and comprising filament holders mounted side by side to grip a straight filament near its ends and to be relatively movable to bend the filament into a curve and bodily movable to carry said bent filament sidewise into said open anchor hooks, and common actuating means for said carrier and said devices.

11. A mount making machine for incandescent lamps and similar articles comprising an intermittently rotatable carrier, stem holders mounted on said carrier to carry along a predetermined path a stem having a pair of leads and a glass arbor, a hook forming device adjacent said path for flattening and then bending into hooks the free ends of leads presented to it, a button making device adjacent said path for heating the end of said arbor and forming it into a button, an anchor inserting device adjacent said path for inserting radial anchors in said button with open hooks disposed about said button as a center and open toward the button, an anchor bending device for bending said anchors down to bring the anchor hook below said button, a filament placing device adjacent said path comprising filament holders mounted side by side to grip a straight filament near its ends and to be relatively movable to bend the filament into a curve and bodily movable to carry said bent filament sidewise into said open anchor hooks, clamping jaws associated with said filament placing device to clamp the hooks on said leads down on the ends of the filament, an anchor hook closing device adjacent said path for closing said anchor hooks around the filament in them, and common actuating means for said carrier and said devices.

12. A mount making machine for incandescent lamps and similar articles comprising an intermittently rotatable carrier, stem holders mounted on said carrier to carry along a pre-determined path a stem having a pair of leads and a glass arbor, a hook forming device adjacent said path comprising flattening jaws for flattening the ends of the leads presented to it, and hook benders for bending the flattened ends into hooks, a button making device adjacent said path for heating the end of said arbor and forming it into a button, an anchor inserting device adjacent said path for inserting horizontal radial anchors in said button and bending the free ends downward and toward said button into open hooks disposed about said button as a center and open toward the button, an anchor bending device for bending said anchors down to bring the anchor hooks below said button, a filament placing device adjacent said path comprising filament holders mounted side by side to grip a straight filament near its ends and to be relatively movable to bend the filament into a curve and bodily movable to carry said bent filament sidewise into said open anchor hooks, a filament pick up for picking up a straight filament and delivering it in a horizontal position to said filament holders, clamping jaws associated with said filament placing device to clamp the hooks on said leads down on the ends of the filament, an anchor hook closing device adjacent said path for closing said anchor hooks around the filament in them, and common actuating means for said carrier and said devices.

13. In a mount making machine for incandescent lamps and similar articles, the combination with a filament placing device having a filament holder for gripping a filament and bodily movable to place said gripped filament in the hooks of a stem, of a filament pick up comprising a receptacle for a plurality of straight filaments lying side by side, a mouth piece having a slot with a width slightly less than the diameter of a filament and mounted to move into said receptacle to fix said slot in said mouth piece in contact with a filament therein with the ends of said slot substantially in alignment with the ends of said filament, a pressure control valve for establishing and destroying suction at said mouthpiece, and actuating means for moving said mouthpiece from said receptacle into registry with said filament holder and simultaneously controlling said valve to pick up a filament and deliver it to said holder.

14. In a mount making machine for incandescent lamps and similar articles, the combination with a filament placing device having a filament holder for gripping a filament and bodily movable to place said gripped filament in the hooks of a stem, of a filament feed comprising a pick up device for picking up and delivering one filament from a bunch of loose filaments, a filament setting device adjacent said pick up device to receive the filament delivered by said pick up device and set it with its end in a predetermined position, a filament conveying device for transferring the set filament to said filament holder, and common actuating means for actuating said devices in sequence.

15. In a mount making machine for incandescent lamps and similar articles, the combination with a filament placing device having a filament holder for gripping a filament and bodily movable to place said filament in the hooks of a stem, of a filament setting device comprising a normally horizontal tiltable shelf having a stop at one end, actuating means for temporarily tilting said shelf to lower said end and for vibrating said shelf while tilted to bring the end of a filament on said shelf against said stop and thereby set it in predetermined position on said shelf, a transfer device for placing said set filament in said filament holder, and common actuating means for said devices.

16. In a mount making machine for incandescent lamps and similar articles the combination with a filament placing device having a filament holder for gripping a filament and bodily movable to place said filament in the hooks of a stem, of a filament setting device comprising a flat vertical seat with a pair of projecting control lugs one at each end and a guide way in its surface, a rod slidably mounted in said guide way in said seat to reciprocate vertically, a shelf pivoted on said rod to lie flat on said seat and having ears at each end to engage said lugs at the limits of its travel, the upper edge of said shelf being normally horizontal and inclined toward said seat and having a stop at one end, means for temporarily restraining said end during the upward travel of said shelf and thereby tilting it during a portion of its upward travel to bring said end below the other end, and actuating means for moving said rod to carry said shelf from one end of said seat to the other and to vibrate it while it is tilted.

17. In a mount making machine for incandescent lamps and similar articles the combination with a filament placing device having a filament holder for gripping a filament and bodily movable to place said filament in the hooks of a stem, of a filament setting device comprising a flat vertical seat with a guide way in its surface, a rod slidably mounted in said guide way in said seat to reciprocate vertically, a shelf pivoted on said rod to lie flat on said seat with its upper edge normally horizontal and inclined toward said seat and having a stop at one end, means for temporarily tilting said shelf during its upward travel to bring said end below the other end and thereby set the end of a filament against said stop, a transfer trough pivoted adjacent the upper end of said seat to form an extension of the upper edge of said shelf when it is horizontal and in its upper position, and actuating means for moving said rod to carry said shelf from one end of said seat to the other.

18. In a mount making machine for incandescent lamps and similar articles, the combination with a filament placing device having a filament holder for gripping a filament and bodily movable to place said filament in the hooks of a stem, of a filament setting device comprising a normally horizontal tiltable shelf having a stop at one end, actuating means for temporarily tilting said shelf to lower said end and for vibrating said shelf while tilted to bring the end of a filament on said shelf against said stop and thereby set it in predetermined position on the shelf, a filament transfer device comprising a rocking trough for receiving the set filament from said shelf, and a movable filament conveyor adjoining said trough at one limit of its travel to receive the filament from it and actuated at the other limit of its travel to deliver the filament to said filament holder, and common actuating means for said devices.

19. A mount making machine comprising a bodily movable stem holder for a stem having anchors with hooks open toward the axis of the stem, a filament placing device for bending a filament into shape and moving it bodily sidewise into said hooks, a hook closer comprising two slides movable in the same plane and perpendicular to each other with their adjacent ends shaped to engage the free end of an anchor hook and bend it around the filament in the hook, and actuating means for moving said stem holder to carry a stem from said filament placing device to said hook closer and to actuate one of said slides to partially close the anchor hook and then actuate the other slide to completely close it.

20. A mount making machine comprising a bodily movable stem holder for a stem having anchors with hooks open toward the axis of the stem, a filament placing device for bending a filament into shape and moving it bodily sidewise into said hooks, a hook closer comprising a horizontally movable slide having a hooked end, a vertical slide movable to bend the free end of an anchor hook around the filament and into the path of the hooked end of said horizontal slide, and actuating means for moving said stem holder to carry the stem from said filament placing device into registry with said hook closer with the free end of the anchor hook overlapping the end of said vertical slide and then moving said vertical slide upwards and said horizontal slide away from the stem to bend the free end of said anchor hook over the filament.

21. In a machine for mounting a filament for incandescent lamps and similar articles on a stem having open hooks disposed about and below its lower end so as to open toward the axis of said stem, the combination of a stem holder, a filament placing mechanism for bending a filament to fit into said hooks, said stem holder and said mechanism being mounted to move relatively to each other in the plane of said bent filament to bring said bent filament into place in said open hooks, and actuating means for producing said relative movement of said stem holder and said mechanism while said stem is in registry with said mechansm.

22. In a machine for mounting a filament for incandescent lamps and similar articles on a stem having hooks which open toward the axis of said stem and are disposed about and below its lower end in the shape of a horseshoe, the combination of a stem holder, a filament placing mechanism for bending a filament into the shape of a horseshoe to fit into said hooks, said mechanism being mounted to move bodily sidewise in the plane of said bent filament to bring said bent filament into place in said open hooks, and actuating means for moving said mechanism bodily sidewise while said stem is in registry with said mechanism.

23. A machine for mounting a filament for incandescent lamps and similar articles on a stem having open hooks disposed about and below its lower end so as to open towards the axis of said stem comprising a stem holder, a filament placing mechanism for seizing a straight filament near its ends and bending it to fit into said hooks, said mechanism being mounted to move bodily to move said bent filament sidewise in its plane and into place in said open hooks, and means for actuating said mechanism to bend said filament while in said mechanism and to move said mechanism bodily while said filament is bent and said stem is in registry with said mechanism.

24. In a machine for mounting a filament for incandescent lamps and similar articles on a stem having at its lower end radial anchors disposed about the lower end of said stem as a center with hooks open towards the axis of said stem, a filament placing mechanism comprising two filament holders normally spaced apart a distance slightly less than the length of a straight filament and mounted side by side to be movable toward each other and to rotate on axes perpendicular to their direction of relative movement, actuating means for moving said holders bodily toward each other and simultaneously turning them on said axes to bend a straight filament held near its ends by said holders into a curved filament which fits into said hooks and for then moving said holders bodily sidewise to carry said bent filament into the open hooks of the anchors on said stem.

25. A filament placing mechanism comprising a pair of filament holders constructed to grip a filament and normally spaced part a distance slightly less than the length of a straight filament and mounted to move toward each other and also to make substantially a quarter turn to bend into a curve a straight filament held in said holders, and actuating means for causing said holders to grip a filament and to move said holders while the filament is gripped.

26. A filament placing mechanism comprising a head, filament holders mounted on said head to move toward each other and to rotate on axes substantially perpendicular to their direction of movement, on said head and normally spaced apart a distance slightly less than the length of a straight filament, means for causing said holders to grip and hold a filament near its ends, means responsive to movement of said holders for partially rotating said holders, and actuating means for said holders.

In witness whereof I have hereunto set my hand this 5th day of December, 1928.

YOSHIRO OTAKA.